(12) United States Patent
Galli et al.

(10) Patent No.: US 7,574,144 B2
(45) Date of Patent: Aug. 11, 2009

(54) SPECTRALLY PHASE ENCODED OPTICAL CODE DIVISION MULTIPLE ACCESS SYSTEM

(75) Inventors: Stefano Galli, Morristown, NJ (US); Ronald C. Menendez, Chatham, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 547 days.

(21) Appl. No.: 11/262,657

(22) Filed: Oct. 31, 2005

(65) Prior Publication Data

US 2008/0107429 A1 May 8, 2008

Related U.S. Application Data

(63) Continuation-in-part of application No. 11/062,090, filed on Feb. 18, 2005.

(60) Provisional application No. 60/635,606, filed on Dec. 13, 2004.

(51) Int. Cl.
*H04B 10/04* (2006.01)
(52) U.S. Cl. .................. 398/189; 398/190; 398/191
(58) Field of Classification Search ............ 398/66–69, 398/77, 78, 182–191
See application file for complete search history.

(56) References Cited

U.S. PATENT DOCUMENTS

| 4,779,266 A | 10/1988 | Chung et al. |
| 4,866,699 A | 9/1989 | Brackett et al. |
| 6,259,723 B1 | 7/2001 | Miyashita .................... 375/141 |
| 6,381,053 B1 * | 4/2002 | Fathallah et al. .............. 398/99 |
| 6,608,721 B1 | 8/2003 | Turpin et al. |
| 6,650,809 B2 * | 11/2003 | He et al. ........................ 385/24 |
| 2004/0213579 A1 * | 10/2004 | Chew et al. .................. 398/183 |
| 2004/0264695 A1 | 12/2004 | Turpin |
| 2005/0019040 A1 * | 1/2005 | Trutna, Jr. .................... 398/183 |
| 2005/0084266 A1 * | 4/2005 | Pohjola et al. ................ 398/77 |

OTHER PUBLICATIONS

Y. Igarashi et al., "Multirate Coherent Ultrashort Light Pulse CDMA Communication Systems with Multipulse PPM and Power Control," 2004 RISP International Workshop on Nonlinear Circuit and Signal Processing, Hawaii, USA., Mar. 5-7, 2004, pp. 45-48.

A. J. Viterbi, "Principles of Spread Spectrum Communication," Addison-Wesley Publishing Company, pp. 97-98.

Z. Jiang et al., "High-Contrast Nonlinear Waveform Discrimination at 10GHz in an Ultrafast O-CDMA Testbed," Ultrafast Optics and Optical Fiber Communications Laboratory, Purdue University, IEEE LEOS Annual Meeting, Tucson, AZ, Oct. 2003.

Z. Li et al., "Simulation of Mode-locked Ring Laser Based on Nonlinear Polarization Rotation in a Semiconductor Optical Amplifier", in Proc. ICTON 2004, Warsaw, Poland, Jul. 2004, pp. 318-321.

* cited by examiner

*Primary Examiner*—Dalzid Singh
(74) *Attorney, Agent, or Firm*—Philip J. Feig

(57) ABSTRACT

System and method for transmitting and receiving encoded signals over a network along with one or more additional signals transported within a spectral gap created by the coded signals.

16 Claims, 21 Drawing Sheets

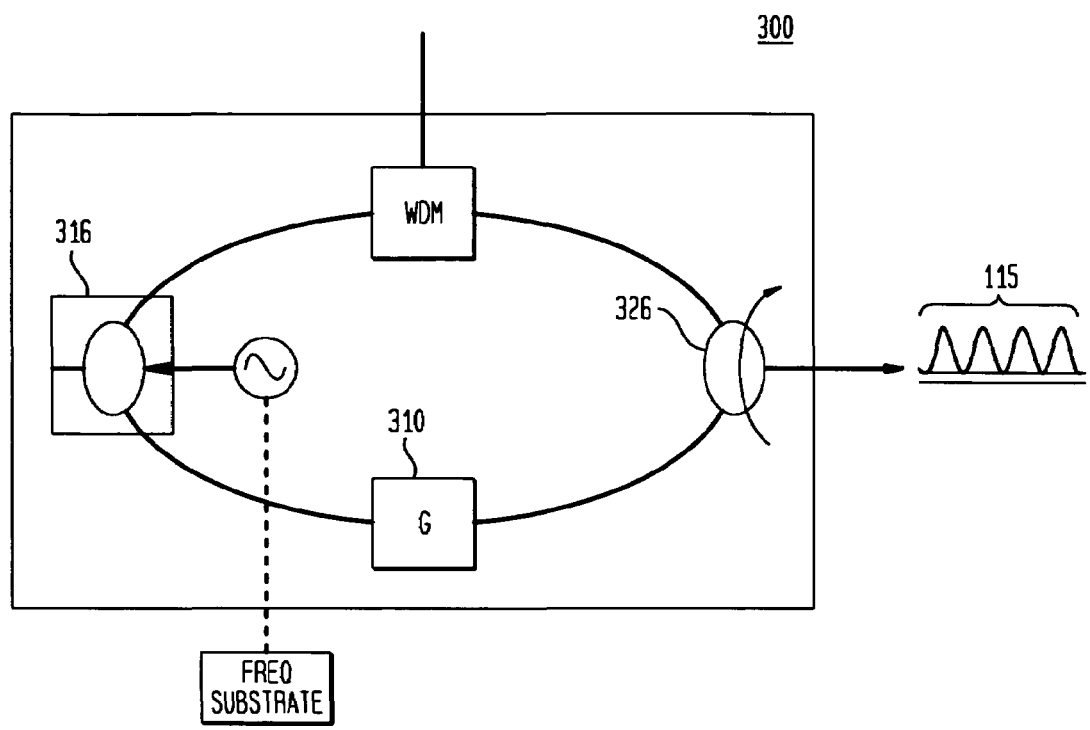

SPECTRALLY PHASE ENCODED OPTICAL CODE DIVISION MULTIPLE ACCESS SYSTEM

CROSS-REFERENCE TO RELATED APPLICATIONS

This application is a continuation-in-part of U.S. application Ser. No. 11/062,090, filed on Feb. 18, 2005, and claims the benefit of the filing date of U.S. Provisional Application No. 60/635,606, filed on Dec. 13, 2004, the disclosures of which are hereby incorporated herein by reference.

STATEMENT REGARDING FEDERALLY SPONSORED RESEARCH

Funding for research was made with Government support under MDA972-03-C-0078 awarded by Defense Advanced Research Projects. The Government has certain rights in this invention.

BACKGROUND OF THE INVENTION

The present invention relates to optical communication and, more particularly, to optical code division multiple access (OCDMA) communication networks.

Various communications schemes have been used to increase data throughput and to decrease data error rates as well as to generally improve the performance of communications channels. As an example, frequency division multiple access ("FDMA") employs multiple data streams that are assigned to specific channels disposed at different frequencies of the transmission band. Alternatively, time division multiple access ("TDMA") uses multiple data streams that are assigned to different timeslots in a single frequency of the transmission band. FDMA and TDMA are quite limited in the number of users and/or the data rates that can be supported for a given transmission band.

In many communication architectures, code division multiple access (CDMA) has supplanted FDMA and TDMA. CDMA is a form of spread spectrum communications that enables multiple data streams or channels to share a single transmission band at the same time. The CDMA format is akin to a cocktail party in which multiple pairs of people are conversing with one another at the same time in the same room. Ordinarily, it is very difficult for one party in a conversation to hear the other party if many conversations occur simultaneously. For example, if one pair of speakers is excessively loud, their conversation will drown out the other conversations. Moreover, when different pairs of people are speaking in the same language, the dialogue from one conversation may bleed into other conversations of the same language, causing miscommunication. In general, the cumulative background noise from all the other conversations makes it harder for one party to hear the other party speaking. It is therefore desirable to find a way for everyone to communicate at the same time so that the conversation between each pair, i.e., their "signal", is clear while the "noise" from the conversations between the other pairs is minimized.

The CDMA multiplexing approach is well known and is explained in detail, e.g., in the text "CDMA: Principles of Spread Spectrum Communication," by Andrew Viterbi, published in 1995 by Addison-Wesley. Basically, in CDMA, the bandwidth of the data to be transmitted (user data) is much less than the bandwidth of the transmission band. Unique "pseudonoise" keys are assigned to each channel in a CDMA transmission band. The pseudonoise keys are selected to mimic Gaussian noise (e.g., "white noise") and are also chosen to be maximal length sequences in order to reduce interference from other users/channels. One pseudonoise key is used to modulate the user data for a given channel. This modulation is equivalent to assigning a different language to each pair of speakers at a party.

During modulation, the user data is "spread" across the bandwidth of the CDMA band. That is, all of the channels are transmitted at the same time in the same frequency band. This is equivalent to all of the pairs of partygoers speaking at the same time. The introduction of noise and interference from other users during transmission is inevitable (collectively referred to as "noise"). Due to the nature of the pseudonoise key, the noise is greatly reduced during demodulation relative to the user's signal because when a receiver demodulates a selected channel, the data in that channel is "despread" while the noise is not "despread." Thus, the data is returned to approximately the size of its original bandwidth, while the noise remains spread over the much larger transmission band. The power control for each user can also help to reduce noise from other users. Power control is equivalent to lowering the volume of a loud pair of partygoers.

CDMA has been used commercially in wireless telephone ("cellular") and in other communications systems. Such cellular systems typically operate at between 800 MHz and 2 GHz, though the individual frequency bands may only be a few MHz wide. An attractive feature of cellular CDMA is the absence of any hard limit to the number of users in a given bandwidth, unlike FDMA and TDMA. The increased number of users in the transmission band merely increases the noise to contend with. However, as a practical matter, there is some threshold at which the "signal-to-noise" ratio becomes unacceptable. This signal-to-noise threshold places real constraints in commercial systems on the number of paying customers and/or data rates that can be supported.

Recently, CDMA has been used in optical communications networks. Such optical CDMA (OCDMA) networks generally employ the same general principles as cellular CDMA. However, unlike cellular CDMA, optical CDMA signals are delivered over an optical network. As an example, a plurality of subscriber stations may be interconnected by a central hub with each subscriber station being connected to the hub by a respective bidirectional optical fiber link. Each subscriber station has a transmitter capable of transmitting optical signals, and each station also has a receiver capable of receiving transmitted signals from all of the various transmitters in the network. The optical hub receives optical signals over optical fiber links from each of the transmitters and transmits optical signals over optical fiber links to all of the receivers. An optical pulse is transmitted to a selected one of a plurality of potential receiving stations by coding the pulse in a manner such that it is detectable by the selected receiving station but not by the other receiving stations. Such coding may be accomplished by dividing each pulse into a plurality of intervals known as "chips". Each chip may have the logic value "1", as indicated by relatively large radiation intensity, or may have the logic value "0", as indicated by a relatively small radiation intensity. The chips comprising each pulse are coded with a particular pattern of logic "1"'s and logic "0"'s that is characteristic to the receiving station or stations that are intended to detect the transmission. Each receiving station is provided with optical receiving equipment capable of regenerating an optical pulse when it receives a pattern of chips coded in accordance with its own unique sequence but cannot regenerate the pulse if the pulse is coded with a different sequence or code.

Alternatively, the optical network utilizes CDMA that is based on optical frequency domain coding and decoding of ultra-short optical pulses. Each of the transmitters includes an optical source for generating the ultra-short optical pulses. The pulses comprise Fourier components whose phases are coherently related to one another. Each Fourier component is generally referred to as a frequency bin. A "signature" is impressed upon the optical pulses by independently phase shifting the individual Fourier components comprising a given pulse in accordance with a particular code whereby the Fourier components comprising the pulse are each phase shifted a different amount in accordance with the particular code. The encoded pulse is then broadcast to all of or a plurality of the receiving systems in the network. Each receiving system is identified by a unique signature template and detects only the pulses provided with a signature that matches the particular receiving system's template.

OCDMA systems are typically designed to function as homogeneous systems where the system bandwidth is used to transport only OCDMA signals. On the other hand, emerging networks are generally optically transparent. In principle, these networks generally allow for a variety of signal types, modulation formats, and bit rates to be transported over a common infrastructure. Wave-division-multiplex (WDM) and Dense WDM (DWDM) networks are examples of such emerging networks. Conventional DWDM signals typically operate on the ITU grid with channel spacings of 100-200 GHz with SONET/SDH signals at 2.5-10 GHz occupying each DWDM channel. Even a 10 GHz SONET signal occupies only a relatively small fraction of the available bandwidth or channel in a DWDM system. It is generally economically desirable to make use of unused portion of the bandwidth to transport other signals, including OCDAM signals.

Of utility then are methods and systems that allow other data or signals to be seamlessly transported over the unused portion of the bandwidth available in such systems.

SUMMARY OF THE INVENTION

An aspect of the present invention is a system for transmitting user data over a network defined by a usable frequency band that includes a continuous frequency range. The system preferably comprises an encoder that operates to encode the signal transmitted by a user to occupy a plurality of non-contiguous frequency bands within the continuous frequency range.

In accordance with this aspect of the present invention, the network preferably comprises an optical network and the continuous frequency range is characterized by a set of discrete frequencies.

Further in accordance with this aspect of the present invention, the system may further comprise a laser source for generating the set of discrete frequencies. In addition, the non-contiguous frequency range preferably comprises a subset of the set of discrete frequencies.

Further in accordance with this aspect of the present invention, the encoder may comprise a phase mask that encodes the phase of each discrete frequency that comprises the subset of discrete frequencies.

Further still, the encoder may comprise a mask that operates to adjust the phase and amplitude of the user signal to convey the user signal over a plurality of non-contiguous frequency bands. In addition, the mask may use a zero-padded orthogonal or quasi-orthogonal spreading sequence.

Further in accordance with this aspect of the present invention, the network may comprise a wireless network and the encoder comprises a pseudo-random phase encoder and the system may also include a radio-frequency transmitter for transmitting the encoded user data onto the network.

In another aspect the present invention comprises an optical code division multiple access system. The system may comprise a data modulator for receiving an optical pulse sequence, each pulse in the phase sequence having N spectral lines, and modulating the pulse sequence to produce a modulated signal; a spectral encoder for encoding the amplitude and phase of the modulated signal, the encoder being operable to define a coding pattern having N symbols, each symbol being associated with a particular one of the N spectral lines of the modulated signal, and forming a plurality of non-contiguous spectral bands separated by one or more spectral gaps.

Further in accordance with this aspect of the present invention, the system may comprise means for transmitting one or more signals using the one or more spectral gaps. In addition, the means for transmitting may comprise a wavelength division multiplexer.

Further still, the data modulator may comprise an on-off keyed modulator. In addition, the spectral encoder may comprise a phase mask filter that defines a phase shift for each of the N symbols. The phase shift for each of the N symbols may comprise an orthogonal or quasi-orthogonal code set In another aspect, the present invention may comprise a method for transmitting data. The method preferably comprises modulating an optical pulse with user data, the modulated optical pulse comprising N-contiguous spectral lines; encoding the modulated optical pulse such that the N-contiguous spectral lines are partitioned into two or more groups of non-contiguous spectral lines within the N-contiguous spectral lines, each of the groups being separated by a frequency band; and adding one or more transport signals to the encoded signal.

The method may further comprise selecting an encoding sequence that is either a spreading sequence or its Fourier transform.

BRIEF DESCRIPTION OF THE DRAWINGS

FIG. 3A illustratively depicts a source in accordance with an aspect of the present invention.

DETAILED DESCRIPTION

Additional details relating to the operation of the devices and systems described below are included in U.S. application Ser. No. 11/062,090, filed on Feb. 18, 2005, ("the '090 application") the disclosure of which is hereby incorporated herein by reference.

Figure 1A:
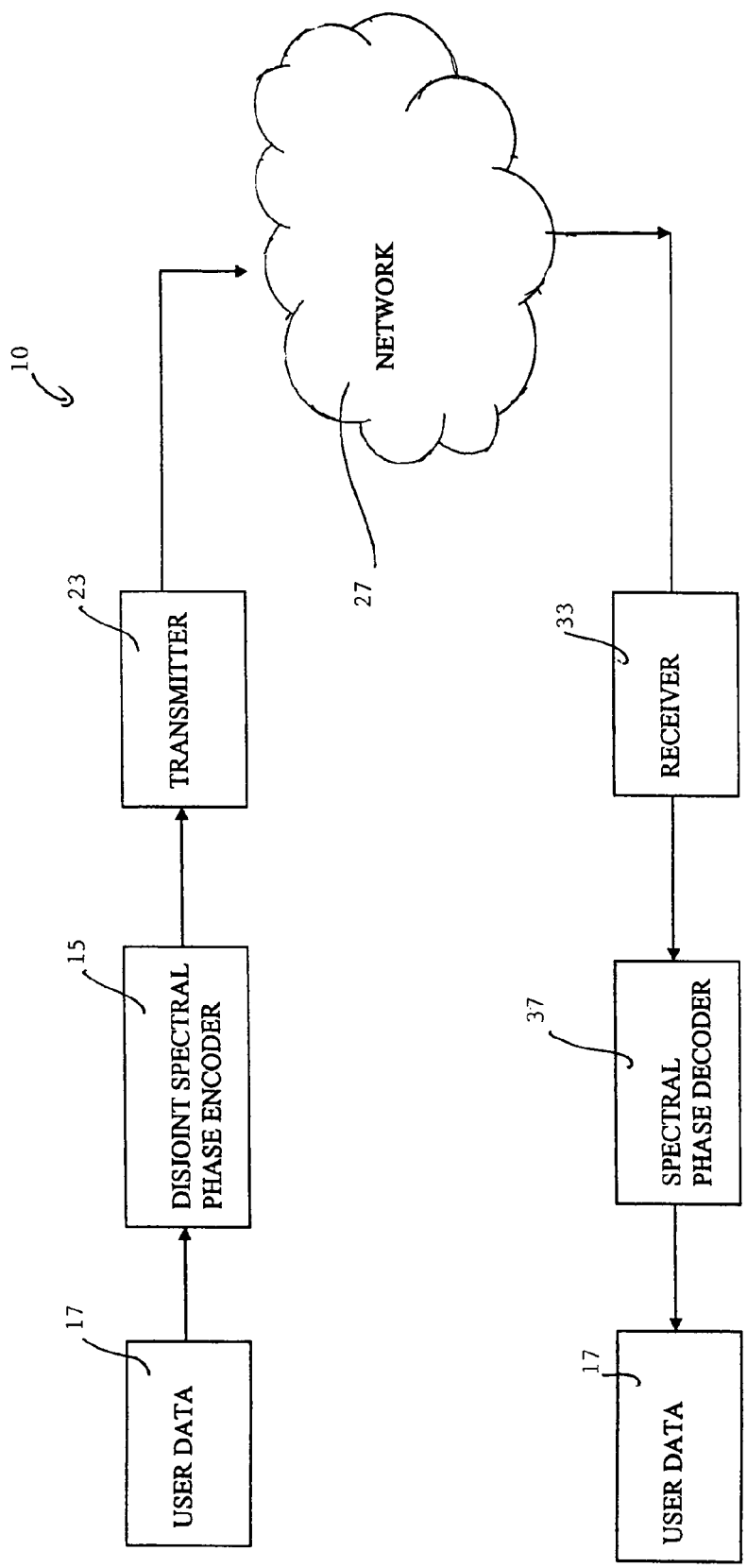
FIG. 1A illustratively depicts a system in accordance with an aspect of the present invention.

FIG. 1A illustratively depicts a schematic block diagram of a system 10 in accordance with an aspect of the present invention. The system 10 includes a disjoint spectral phase encoder 15 for receiving and encoding user data 17. The encoded user data 21 is then provided to a transmitter 23 and send over a network 27 to a receiver 33. The receiver 33 processes the signal and supplies the processed signal to a spectral phase decoder 37 that decodes the data and reproduces the user data 17. The phase encoder 15 preferably encodes the signal such that it uses the bandwidth available in the network 27 without interfering with other signals that the network 27 may have been specifically engineered to transport.

Figure 1B:
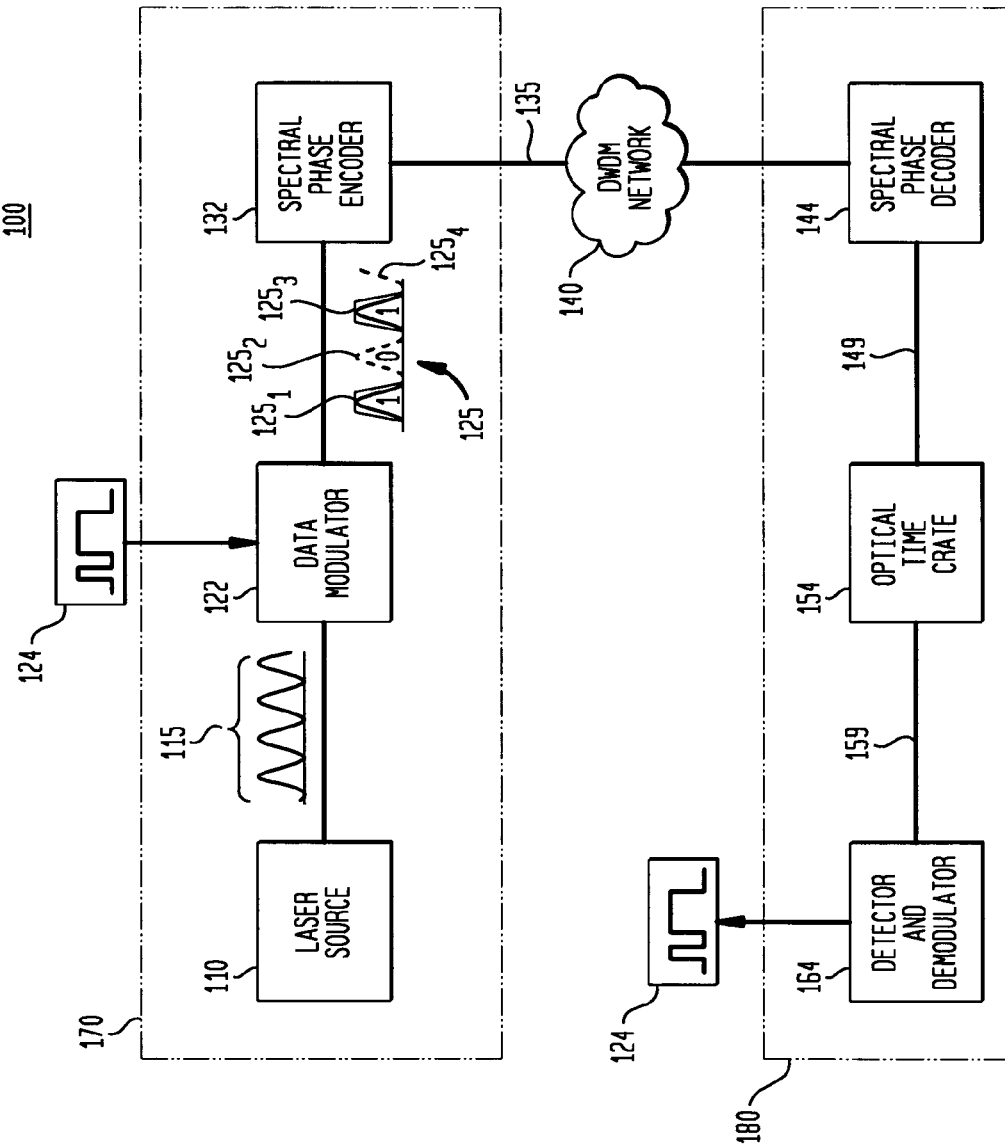
FIG. 1B illustratively depicts a system in accordance with an aspect of the present invention.

For example, FIG. 1B shows a system 100 that may be implemented in accordance with the foregoing aspect of the present invention. In particular, FIG. 1B illustratively depicts a system 100 that comprises a laser source 110 that generates a sequence of optical pulses 115 that are fed to a data modulator 122. The data modulator 122 also receives a data stream 124 that is used to modulate the sequence of optical pulses 115. The modulation data preferably comprises a digital data stream generated by a subscriber or user station 124. In a preferred embodiment, the data modulator 122 comprises an ON/OFF keyed data modulator wherein a "1" symbol or bit in the digital data stream corresponds to the presence of an optical pulse and a "0" symbol or bit corresponds to the absence of an optical pulse. In this way, each pulse represents a bit of information. For example, a modulated stream 125 is shown where the digital data stream comprises a "1010" data sequence. As shown, each time slot with the bit "1" will result in the presence of an optical pulse ($125_1$ and $125_3$), whereas each time slot with a "0" bit indicates the absence of an optical pulse ($125_2$ and $125_4$), which are shown as dashed lines to indicate their absence.

The modulated data stream 125 is then fed to a spectral phase encoder 132. As is discussed in further detail below, the spectral phase encoder 132 applies a phase code associated with a user to each optical pulse in the data stream to produce an encoded data stream 135. The phase code operates to provide a "lock" so that only a corresponding phase decoder with the appropriate "key" or phase conjugate of the phase code of the spectral phase encoder may unlock the encoded data stream. Typically, a spectral phase encoder is associated with a particular user and therefore allows only another user with the appropriate key to decode or receive information from the particular user. The information appears as noise to users that do not have the appropriate key.

The encoded data stream 135 may then be transported over a network 140, such as Wavelength Division Multiplex (WDM) network for example, to a spectral phase decoder 144 that, preferably, applies the phase conjugate of the phase code of the spectral phase encoder 132, as discussed above. The spectral phase decoder 144 provides a decoded data stream 149 to an optical time gate 150. As is discussed in detail below, the optical time gate 154 operates to reduce multiple access interference by temporally extracting only a desired user channel from among the decoded stream. The optical time gate 154 produces a user data stream 159, which is fed to a data demodulator 164. Where ON/OFF keying was employed at the transmitting end, the data demodulator 164 comprises an amplitude detector that reproduces the digital data stream 124.

In accordance with an aspect of the present invention, the laser source 110, data modulator 122 and spectral phase encoder 132 may comprise a transmitting station 170 associated with a user. The spectral phase decoder 144, optical time gate 154 and demodulator 164 may preferably comprise a receiving station 180 associated with a user.

Figure 2:
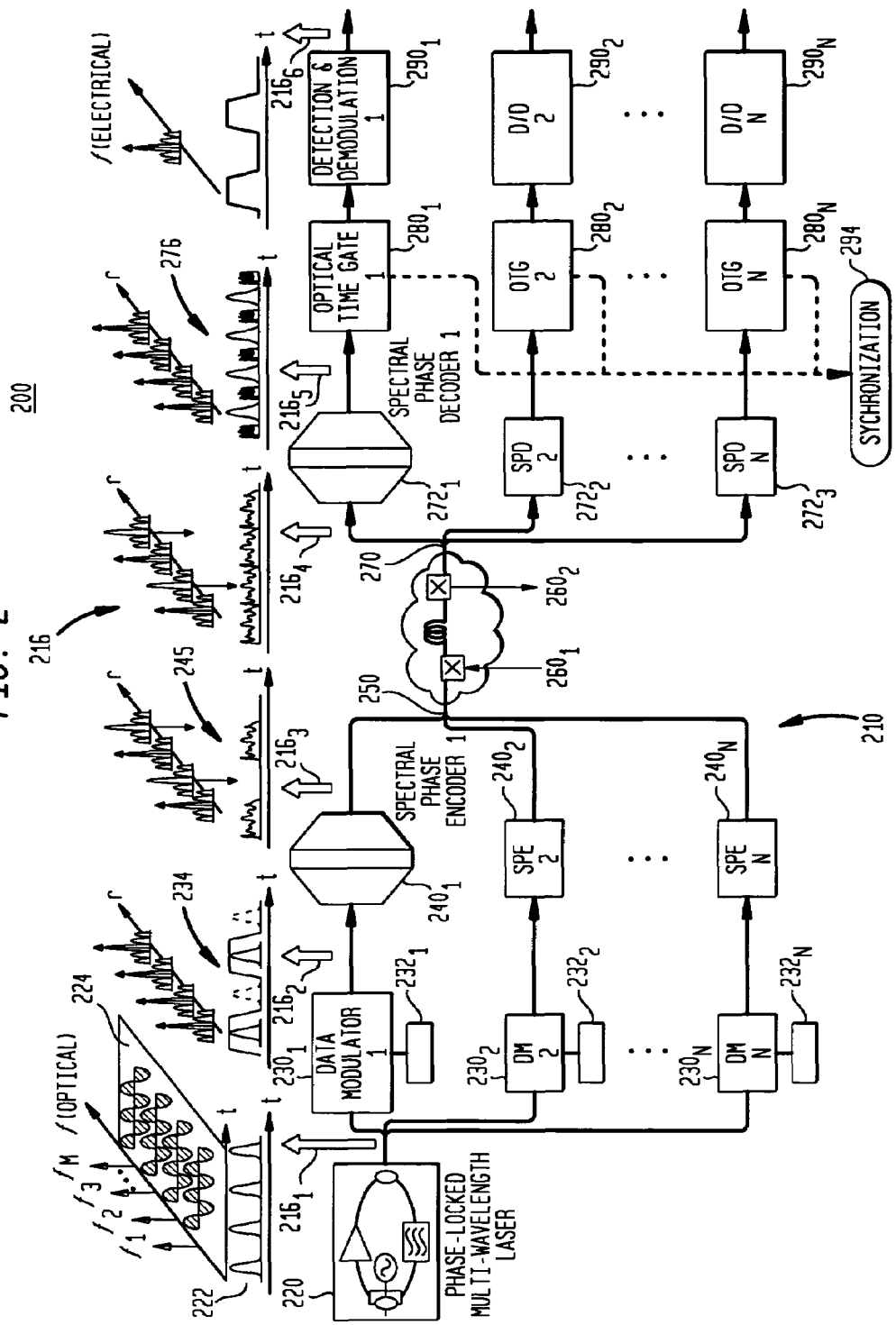
FIG. 2 illustrates a multi-user system in accordance with an aspect of the present invention.

FIG. 2 illustrates a multi-user system 200 in accordance with an additional aspect of the present invention. In addition to illustrating a system 210, FIG. 2 also includes a diagram 216 that depicts signal flows through the system in the time and frequency domain. In particular, the spectrum and temporal intensity of the optical source is identified by arrow $216_1$; after ON/OFF data modulation by arrow $216_2$; after phase encoding by arrow $216_3$; after mixing all users by arrow $216_4$; after the decoder of the first user by arrow $216_5$; and after time gating and optical-to-electrical (O/E) conversion by arrow $216_6$. In general, the system 210 also includes a multi-wavelength laser source 220 that generates a train of pulses 222. The pulses 222 are split and provided to one or more data modulators $230_1$ through $230_N$. Each data modulator modulates pulses using user data 532. The modulated data pulses are each provided to respective spectral phase encoders $240_i$. The encoded signals 242 are combined in multiplexer 250 and provided to a DWDM network 256. In accordance with this aspect of the present invention, the encoders 240 encode the signals such that transport signals $260_1$, e.g., SONET or other DWDM signals, may be seamlessly transported over the DWDM network 256 along with the phase encoded signals.

After the encoded signals 242 and transport signals 260 traverse the network 256, the transport signals are demultiplexed $260_2$ and routed to their destination. The encoded signals are split at splitter 270 and provided to a plurality of matching encoders $272_1$ through $272_N$. The signals from the phase decoders 272 are further processed by respective optical time gates $280_1$ through $280_N$ and demodulators $290_1$ through $290_N$ to reproduce the user or subscriber data. A synchronization block 294 supplies a control or clock signal that closes the time gates 280 at the proper time interval as is discussed in further detail below.

FIG. 3A illustratively depicts a laser source 300 that may be used to generate the pulse stream 115 or 222 in accordance with an aspect of the present invention. The laser source 300 preferably comprises a mode locked laser (MLL) having a spectral content comprising a stable comb of closely spaced phase-locked frequencies. The frequency or comb spacing is determined by the pulse repetition rate of the MLL. As shown in FIG. 3A, the source 300 may comprise a ring laser that may be formed using a semiconductor optical amplifier (SOA) or erbium doped fiber amplifier (EDFA). The ring laser illustrated in FIG. 3A includes a laser cavity 310, a modulator 316, a wavelength division multiplexer (WDM) 322 and a tap point 226 for providing an output signal, which comprises optical pulses 115.

Figure 3B:
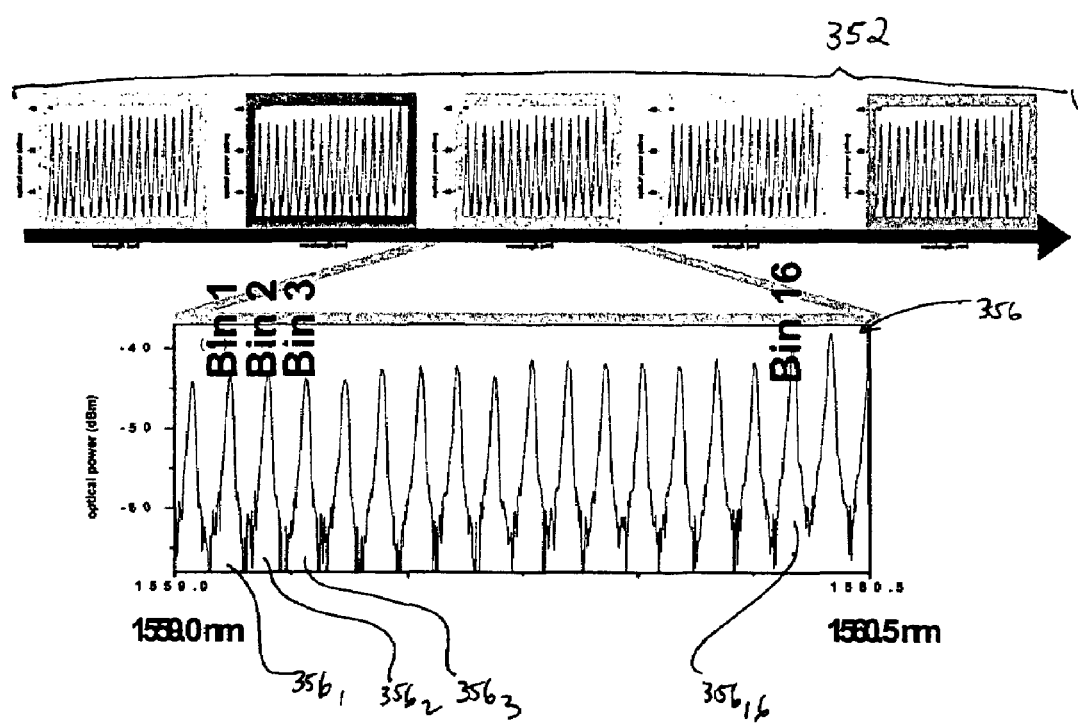
FIG. 3B is a spectral plot showing the modes or lines of a laser source in accordance with an aspect of the present invention.

FIG. 3B illustratively depicts a frequency plot 350 of the output of a MLL, such as MLL 300, in accordance with an aspect of the present invention. The spacing of the longitudinal modes or spectral lines is equal to the pulse repetition rate, for example, 5 GHz. The longitudinal modes are continuous wave laser lines that can be used as carriers in a wave-band with tunable granularity for the user application. As also seen in FIG. 3B, the total spectral width of the source may be limited to, for example, 80 GHz by placing an optical band pass filter in the laser cavity. The top portion 352 of FIG. 3B shows multiple windows that illustratively indicate the tunability of the source. Each discrete line or mode 356 of the laser comprises a frequency chip or bin. FIG. 3B illustratively 16 frequency bins or chips, although the number of frequency bins may be more or less than 16.

In general, the electric field m(t) output of the MLL is a set of N equi-amplitude phase-locked laser lines:

$$m(t) = A \sum_{i=1}^{N} e^{j(2\pi f_i t + \phi)} \quad (1)$$

where $f_i = \sim 193$ THz$+(i-1)\Delta f$ are equally spaced frequencies. Signal m(t) is a periodic signal comprising a train of pulses spaced $1/\Delta f$ seconds apart and each pulse having a width equal to $1/(N\Delta f)$ seconds. We can also express (1) as:

$$m(t) = \sum_{k} p(t - kT) \quad (2)$$

where p(t) represents a pulse of duration $T=1/\Delta f$ whose energy is mostly confined in the main lobe of width $1/(N\Delta f)$. With regard to FIG. 3A, N=16 and $\Delta f$ is set to 5 GHz. $\Delta\theta$ may also be set to 10 GHz or other values depending on the application.

In its idealized form, the spectral phase encoders comprise a hyperfine encoder for user i that acts as a phase-mask filter with frequency response $E^{(i)}(f)$:

$$E^{(i)}(f) = \sum_{j=1}^{N} c_j^{(i)} Rect_{\Delta f}(f - f_j) \quad (3)$$

where $c_j^{(i)}$ are complex symbols indicating the j-th($1 \leq j \leq N$) element of the i-th code $c^{(i)}$ ($1 \leq i \leq M$), and the function $Rect_w(f)$ denotes the rectangle function of unitary amplitude and width W defined as:

$$Rect_W(f) = \begin{cases} 1, & |f| < W/2 \\ 0, & \text{otherwise} \end{cases} \quad (4)$$

Although in principle the elements of code $c^{(i)}$ can take any complex value, the phase mask currently employed allows only for unitary amplitude and binary phase values:

$$c_j^{(i)} = e^{j\alpha_j(i)}, \text{ with } \alpha_j^{(i)} \in \{0,\pi\} \Rightarrow c_j^{(i)} \in \{-1,1\} \quad (5)$$

Figure 4:
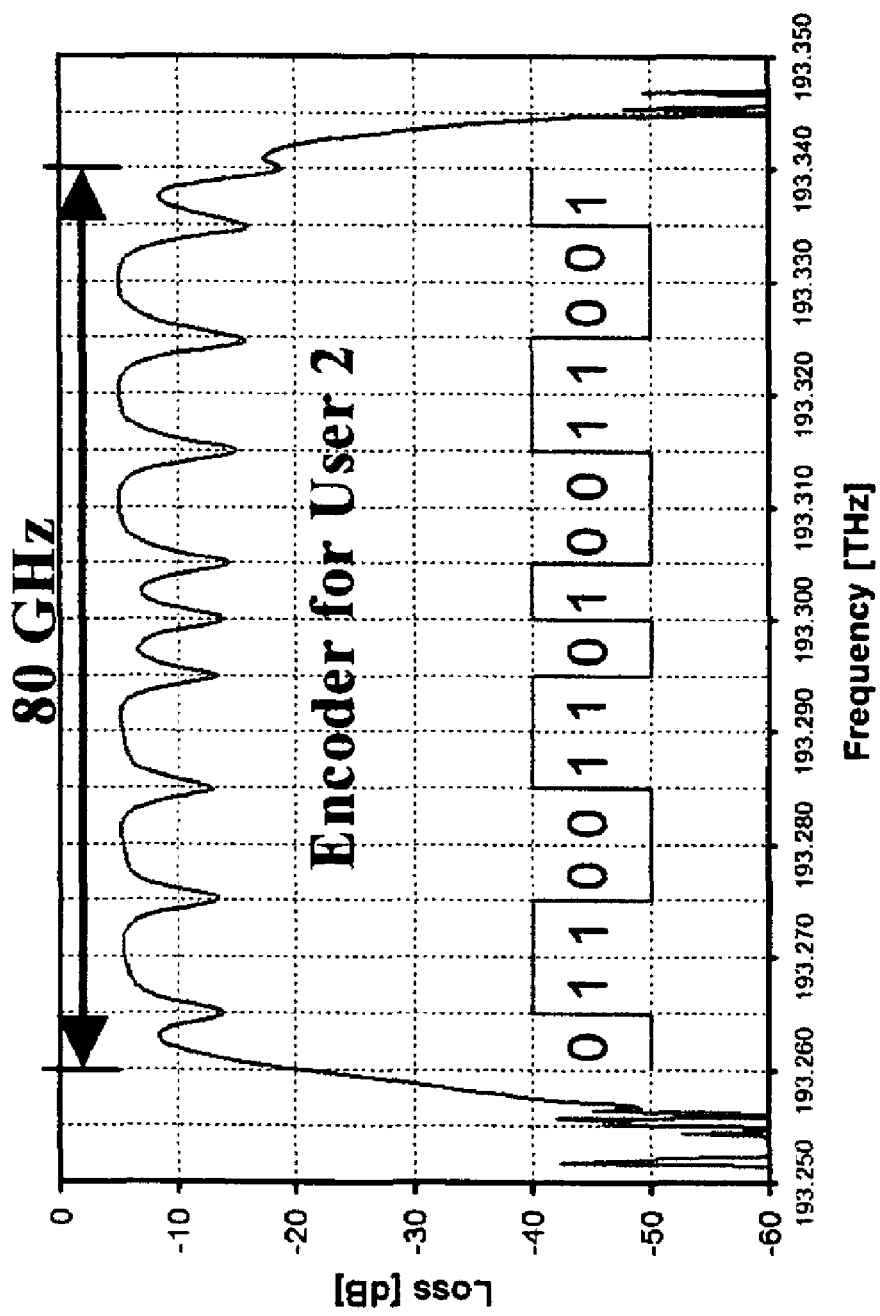
FIG. 4 is a plot illustrating the measured intensity transfer function of an encoder used in accordance of an aspect of the present invention.

Ideally, all the spectral components of the unencoded signal would emerge from the encoder unchanged in amplitude but, in some cases, flipped in phase. Due to the finite diffraction-limited spot size of the imaging optics, a spectral component situated at a phase transition boundary (or bin edge) will overlap two values of $c_j^{(i)}$ and effectively be cancelled when $c_j^{(i)}$ are of opposite signs. The effect of phase encoding is to spread in time the MLL narrow pulses, originally of width $1/(N\Delta f)$, across the whole pulse interval of $1/\Delta f$. Therefore, the proposed phase encoded OCDMA can be considered as the dual version of conventional direct sequence CDMA (DS-CDMA) based on frequency spreading. FIG. 4 shows the measured intensity transfer function of an encoder used in the systems described herein and discussed in further detail below.

Due to the bin edge effects in the phase mask, the OOK (ON/OFF Keying) modulation rate is preferably chosen so that the spectrum broadening of each of the N spectral lines is confined to $\Delta f/2$ Hz. OOK modulation at a rate of $R_b = \Delta f/2$ bits/sec that uses multiple pulses from the MLL to represent a single bit satisfies this physical restriction. As an alternative, using duobinary encoding and then modulating at the full rate $R_b = \Delta f$ bits/sec ensures that the spectral constituents of the data-modulated signal stay within their respective $\Delta f$-wide frequency bins. In principle, if no amplitude bin-edge effect were present, full rate modulation would be possible even without line coding. Therefore, after modulation the temporal expression of the signal pertaining to the i-th user can be written as follows:

$$b^{(i)}(t) = \sum_{k} a_k^{(i)} p(t - kT) \quad (6)$$

where $\alpha_k^{(i)} \in \{0,1\}$ is the sequence of information bits of user i. After phase encoding, we obtain:

$$s^{(i)}(t) = b^{(i)}(t) * e^{(i)}(t) = \sum_{k} a_k^{(i)} q^{(i)}(t - kT) \quad (7)$$

where $e^{(i)}(t) = FT^{-1}\{E^{(i)}(f)\}$ is the impulse response of the spectral phase encoder $E^{(i)}(f)$ as defined above; $FT^{-1}$ is the Inverse Fourier Transform (IFT) operator; $q^{(i)}(t)=p(t)*e^{(i)}(t)$ represents the pulse shape of user i after encoding. If we neglect the effects of the pulse output by the MLL, the shape of the pulse is governed by the phase mask. where $e^{(i)}(t) = FT^{-1}\{E^{(i)}(f)\}$ is the impulse response of the spectral phase encoder $E^{(i)}(f)$ as defined above; $FT^{-1}$ is the Inverse Fourier Transform (IFT) operator; $q^{(i)}(t)=p(t)*e^{(i)}(t)$ represents the pulse shape of user i after encoding. If we neglect the effects of the pulse output by the MLL, the shape of the pulse is governed by the phase mask.

Figure 5:
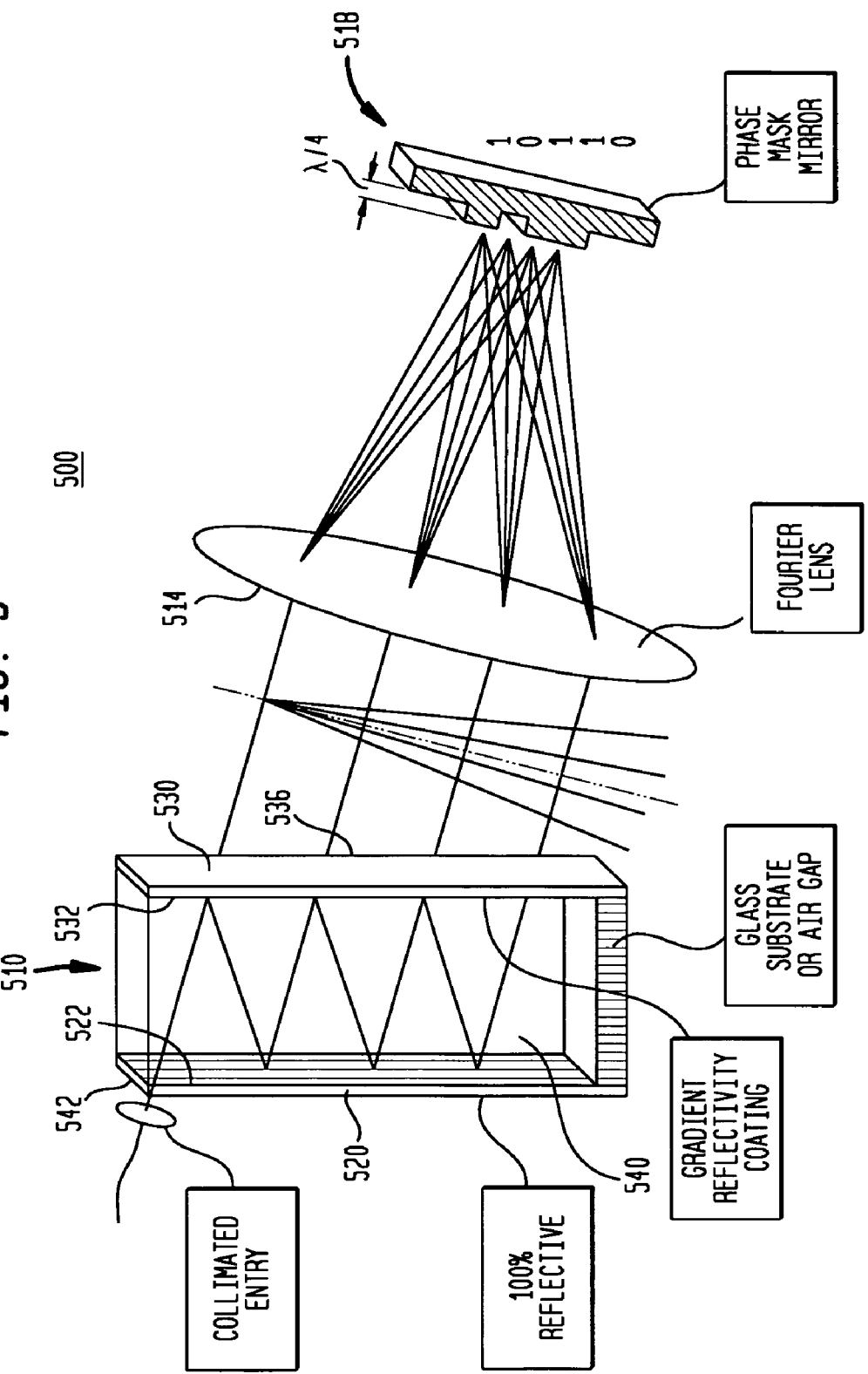
FIG. 5 illustrates an encoder/decoder in accordance with an aspect of the present invention.

Turning now to FIG. 5, there is depicted a spectral phase encoder 500 in accordance with an aspect of the present invention. The encoder 500 includes a transparent plate 510, a Fourier lens 514 and a phase mask mirror 518. The plate 510 comprises a first element 520 that includes an inner surface 522 and an outer surface 526. The first element 520 is spaced from a second element 530 that also has an inner surface 332 and an outer surface 536. The inner surface 522 of the first element provided with a coating that is substantially 100% reflective. The inner surface 532 of the second element is provided a partially reflective coating. The first and second elements 520, 530 may be separated by a glass substrate 340, as shown, or by an air gap. The arrangement of the transparent plate and Fourier lens comprise an optical demultiplexer and may comprise structure or components as described in U.S. Pat. No. 6,608,721, the disclosure of which is incorporated herein by reference.

As shown, the first element 520 and glass substrate 540 are arranged such that an opening 542 is provided at one end of the plate 510. The opening 542 provides an entry point for a beam of light to enter the cavity so that a portion of the light beam is partially reflected by the surface 532 to surface 522, thereby establishing a cavity where the input light beam is split into multiple beams that are each projected onto the Fourier lens 514. The Fourier lens 514 then projects each mode or line of each beam to a particular location in space based on the wavelength or frequency of each mode. In particular, the phase mask mirror 518 is positioned at the focal plane of the Fourier lens 514 such that each mode or line is projected to a particular location on the phase mask mirror to cause a predetermined phase shift. In this way, the phase of each line or mode of the laser source (each such line or mode comprising a frequency bin or chip) is adjusted by a predetermined amount by the phase mask mirror. The phase mask mirror 518 then reflects the phase adjusted signals back through the Fourier lens 514 to the plate 510 where the phase adjusted signals exit through opening 542 as a collimated phase adjusted beam of light.

As shown in FIG. 5, each section of the phase mask 518 is recessed at 0 or $\lambda/4$ with respect to the focal plane of the Fourier lens 514 thereby representing a 0 or $\pi$ phase shift, respectively. The phase mask of FIG. 5 includes five sections which comprise a "10110" phase mask, wherein a "1" represents a phase shift of $\pi$ and a "0" represents a phase shift of 0. As is discussed in further detail below, each user is assigned a unique phase mask that includes a section for each frequency bin or chip in the system. The unique phase mask corresponds to a unique code or lock that is associated with a particular user such that a receiving unit needs the appropriate code or key to decipher a message from the particular user. In addition, the encoder 500 may also be used at the receive end as a decoder.

Figure 6A:
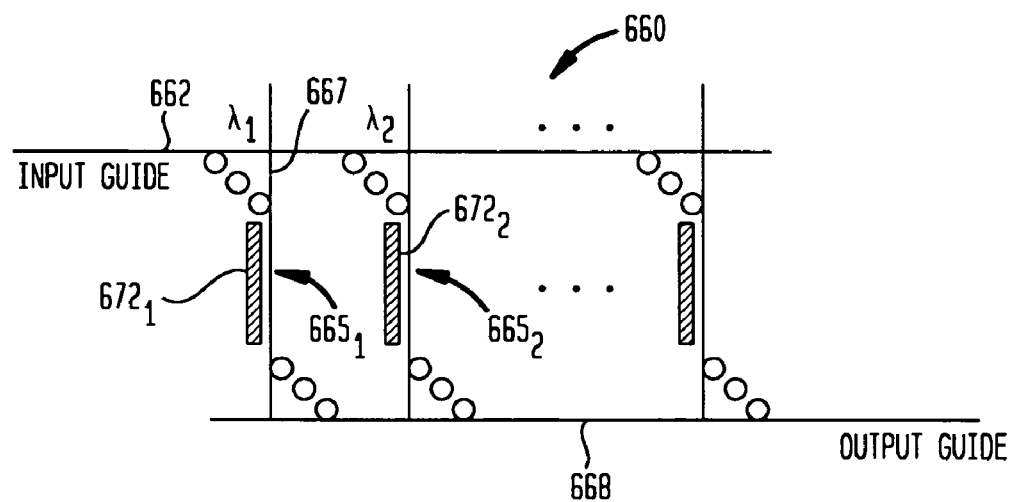
FIG. 6A illustrates an encoder/decoder in accordance with an aspect of the present invention.

The encoder of FIG. 5 is typically large since it uses bulk optics. The size of such encoders/decoders typically make them susceptible to thermally induced drifts. Furthermore, the large size and complex alignment requirements may make it unlikely that the coder/decoder of FIG. 5 will be economically viable. As discussed above, spectral phase encoding consists of demultiplexing the various spectral components of a signal, shifting the phase of a portion of the spectrum based on the code and recombining the shifted components to produce the coded signal. The recombined signal no longer comprises a short optical pulse, but instead, the energy in the pulse is spread across the bit period in a pattern determined by the code. In accordance with an aspect of the present invention, we use a coder/encoder in form of an integrated photonic circuit, which uses ring resonators as wavelength selective subcomponents. FIG. 6A illustratively depicts a functional diagram of such a coder 660.

As shown in FIG. 6A, light enters from the left on the input guide 662. At a first ring resonator structure 665, subwavelength $\lambda_1$ is coupled off the guide 662 and onto the connecting guide (vertical line 667). At the bottom of vertical line 667, $\lambda_1$ is coupled onto the output guide 668 with another wavelength selective ring resonator. Each of the frequency components is coupled in the same way at the appropriate point. If all the connecting guides have the same optical length, and if the input and output guide have the same propagation constant, then all frequency components will see the same optical path length when they reach the end of the output guide. In this case, all would recombine with the same phase that they had at entry (i.e., this is equivalent to a code with all 0's or all 1's). To create a phase shift that defines a code, we use heaters on the connecting waveguides, shown here as blocks 672. The electrical connections to the heaters are not shown to avoid unnecessarily complicating the diagram. If the connecting waveguides are far enough apart, then they are sufficiently thermally isolated that the phase shifts can be applied independently. With thermal monitoring and feedback, independent phase shifts can be applied to each frequency even when the guides have some effect on each other.

A decoder typically has the same structure as an encoder, except that it may need to be polarization insensitive, since the signals may have their polarization altered in transmission through the fiber. The coder can have polarization dependence, since the initial mode-locked laser pulse is polarized.

Figure 6B:
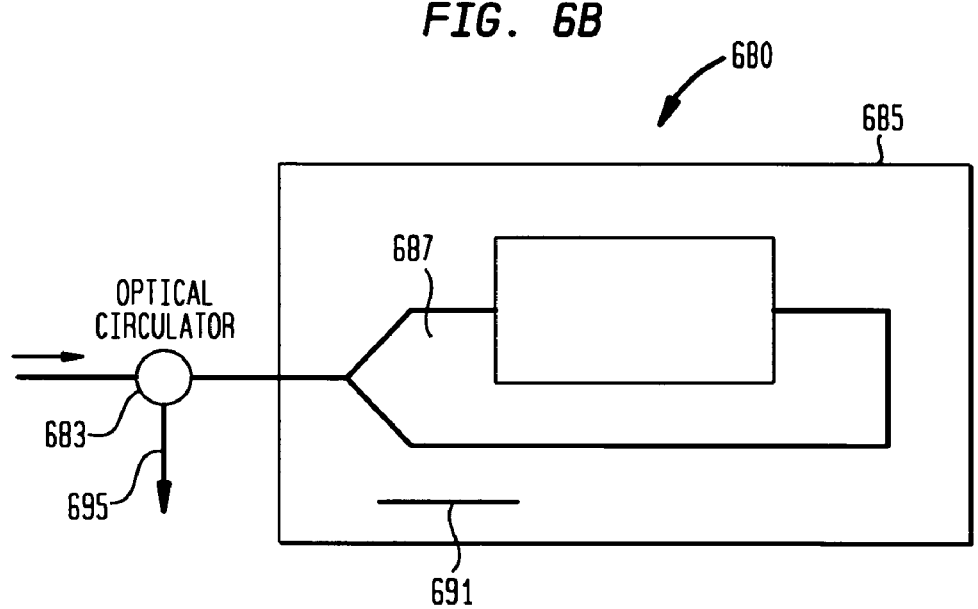
FIG. 6B illustrates an encoder/decoder in accordance with an aspect of the present invention.

An example of a polarization independent coder is shown in FIG. 6B. Note that each frequency passes through the same number of elements (two ring resonators for its frequency, and N−1 ring resonators that it passes through without being dropped/added) and the same optical path length, except for the phase shift that is applied thermally. Thus, each should experience the same loss. Consequently, there is no skewing of the amplitudes and the decoded pulse shape will be the same as the input to the coder. In addition, because the base path lengths are the same (except for some trimming to adjust for fabrication error) creating the correct phase relationships will typically be straightforward.

For polarization insensitivity we use the same structure at the core, but separate input polarizations, and have them pass through the coder/decoder 680 as shown in FIG. 6B.

As shown in FIG. 6B, light enters and passes through an optical circulator 683. The light is split into two polarizations using a polarization beamsplitter (PBS) 685 and one polarization follows the upper path 687 while the orthogonal polarization follows the lower path 689. On the lower path a polarization rotator 691 converts the polarizations from one mode to another orthogonal mode, e.g., $P_1$ into $P_2$ (or vice versa). The light in the upper path enters the coder structure 693 in polarization mode 1 at the point previously called the input 662, and the light in the lower path enters the coder also in polarization mode 1, but at the point previously called the output 668, traveling in the opposite direction. The light from the upper path exits the coder, passes through the polarization rotator and is converted to polarization mode 2, which then passes through the PBS 385 and is sent back to the circulator 683 from which it exits along the path shown as a vertical line 695. The light from the lower path, now in polarization mode 1, goes through the coder in the opposite direction, but experiences precisely the same phase shifts and optical path lengths as the light from the upper path. It exits the coder and is recombined in the PBS 685, and exits the circulator 683 in the same way as the light from the other path. Thus, this comprises a polarization independent component. The structures that are shown in block 685 can either be realized in fiber or can be built onto an optical waveguide. Without this polarization independent construction, it would be necessary to have a polarization sensor and a dynamic polarization rotator before the decoder. Note that in this design, path lengths are the same and the path is the same for both polarizations. The difference is that the two polarizations traverse the path in opposite directions.

Returning to FIG. 2, in a multi-user system, the encodes users' signals 242 are combined 250 prior to transmission over the fiber links that comprise the network 256:

$$x(t) = \sum_{i=1}^{M} s^{(i)}(t - \tau^{(i)}). \tag{8}$$

Where $\tau^{(i)}$ is the random delay at user i.

As was discussed above, the encoded signal is decoded by a spectral phase decoder 144/270 after traversing the network and arriving at the receiving station. The spectral phase decoder 144 will typically comprise the arrangement shown in FIGS. 5 and 5, except that, in general, the decoder will apply the phase conjugate of the phase mask applied by the encoder. Note, however, that where the phase mask uses a binary coding scheme, the code is its own complement and consequently the coder and decoder are identical. In particular, assuming that fiber propagation is ideal, discrimination of the i-th user is performed using a decoding filter $d^{(i)}(t)$ at the receiver matched to the encoder filter only (single user matched filtering). This is achieved by employing at the receiver side a decoder equal to the conjugate of the phase mask used at the transmitter side:

$$y^{(i)}(t) = x(t) * d^{(i)}(t) \tag{9}$$

where $d^{(i)}(t)$ is the impulse response of the matched filter $$d^{(i)}(t) = e^{*(i)}(-t) \Leftrightarrow D^{(i)}(f) = E^{*(i)}(f) \tag{10}$$

The output of the filter matched to the desired user i can be expressed as follows (assuming $\tau^{(i)}=0$):

$$y^{(i)}(t) = b^{(i)}(t) * AC_i(t) + \sum_{j=1, j \neq i}^{M} b^{(j)} * CC_{j,i}(t - \tau^{(j)}) \tag{11}$$

where we have defined as $AC_i(t) = e^{(i)}(t) * e^{*(i)}(-t)$ and as $CC_{j,i}(t) = e^{(j)}(t) * e^{*(i)}(-t)$ the autocorrelations (ACs) and the cross-correlations (CCs) of the impulse responses of the phase masks, respectively. The ACs and CCs are a function of the IFT of the sequences used as phase masks. It is important to point out that, as opposed to the case of conventional CDMA based on DS spreading, correlations are between the IFT of codes, not between the codes themselves. The effect of a matched phase decoder is to restore the original narrow pulses of width $1/(N\Delta f)$ seconds that were originally spread in time by the phase encoder. In most other OCDMA systems, the effect of a mismatched phase decoder is to turn interfering signals into a noise-like signal. However, in our system, the effects of decoding are to turn interfering signals into another set of coded signals. Therefore, at the output of a decoder we have that the properly decoded signal (the user of interest) is observed in the presence of other encoded signals. This property can be exploited to enhance signal detection. It is also worth pointing out that when orthogonal codes are employed, as opposed to conventional OCDMA, true orthogonality is achieved and Multiple Access Interference (MAI) is not expected to be present at the ideal sampling time.

The signal from the spectral phase decoder 144 is then fed to the optical time gate 154/280. The OTG filters out MAI by temporally extracting only the desired user. Time gating also allows us to utilize receivers with a bandwidth equal to the de-spread signal($\Delta f$) instead of the full bandwidth of the signal ($N\Delta f$).

Figure 7A:
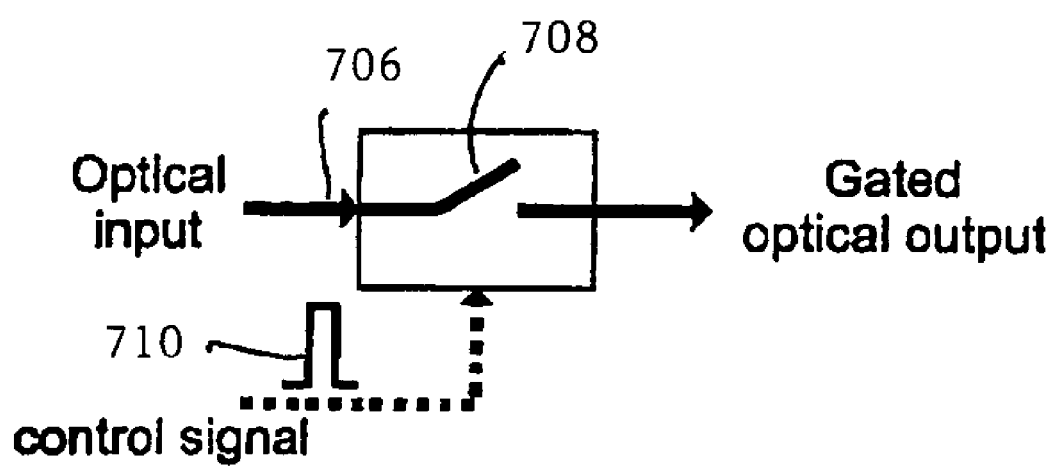
FIG. 7A illustrates an optical time gate in accordance with an aspect of the present invention.

Turning now to FIG. 7A, there is shown an optical time gate 700 in accordance with an aspect of the invention. The decoded signal has the sequence or train of optical pulses restored to their original position within the bit period and shape. However, the desired user signal needs to be separated or extracted from other user signals included in the decoded signal. The optical time gate 700 filters out MAI by temporally extracting only desired user signal or channel from among any other signals comprising the decoded signal. As shown in FIG. 7A, the optical time gate 400 includes an input port 706 and a switch 708 that is controlled by a control signal 710. The control signal 710 may be an electrical or optical signal.

Figure 7B:
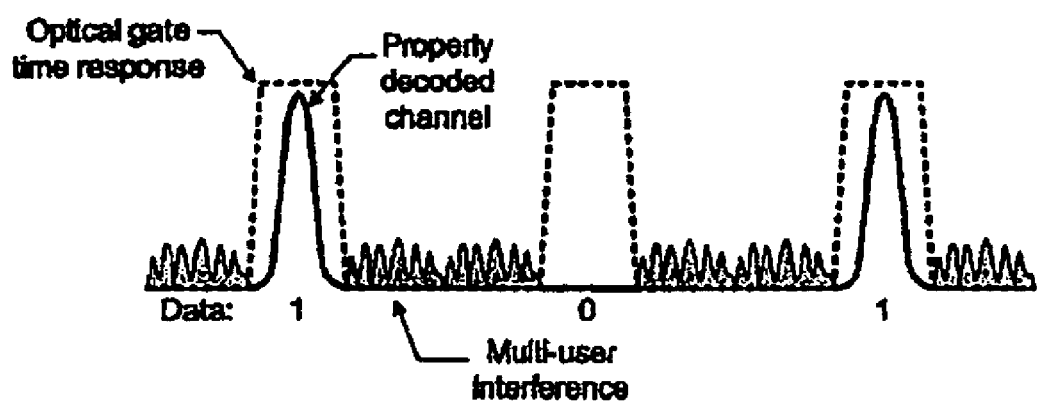
FIG. 7B illustrates optical time gating.

The concept behind the application of optical time gating to extract the decoded OCDMA signal is illustrated in FIG. 7B. Through the proper selection of an appropriate code set for a synchronous coherent OCDMA system, a system may be designed such that the multi-user interference energy falls outside a time interval where the properly decoded signal pulse resides. Therefore, by optically gating the composite signal in order to provide low loss within the desired time window while at the same time providing for high extinction outside that window, one can extract only the properly decoded signal bit stream.

Figure 7C:
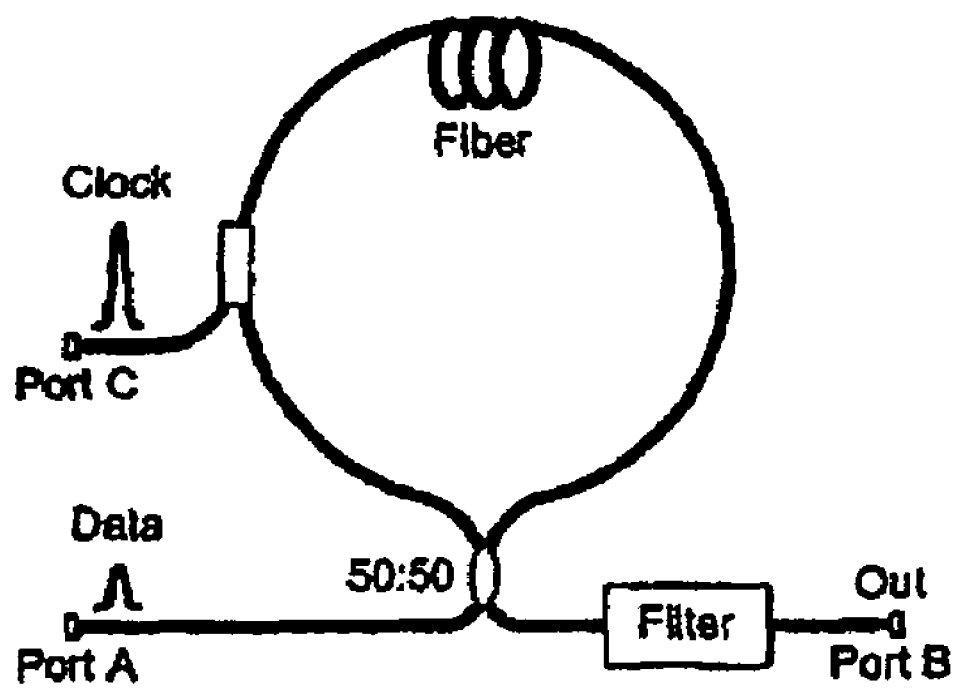
FIG. 7C illustrates an optical time gate in accordance with an aspect of the present invention.

By using an optical clock pulse in order to alter the effective phase shift through one arm of an interferometer, one can construct an all-optical time gate. The phase changed can be accomplished through a distributed medium, such as nonlinear propagation through a length of optical fiber, or it can be a concentrated nonlinearity, such as can be accomplished with a semiconductor optical amplifier (SOA). Since interferometers generally require stabilization for proper operation, a common approach for fiber-based nonlinear interferometers, which generally require long lengths of fiber and therefore path lengths can drift with environmental conditions, is the nonlinear optical loop mirror (NOLM). With reference to FIG. 7C, the NOLM is built in a Sagnac interferometer configuration, which by its construction is self-stabilizing.

The operation of the NOLM can be described as follows, assuming for simplicity that the input signal is a single optical pulse. The incoming signal, input at Port A, is split into two counterpropagating pulse replicas at a 50:50 fiber coupler. When the clock pulse, which can be injected at Port C, is not present, the low amplitude data pulses simply counterpropagate around the loop and recombine at the coupler. The interference condition is such that signals interfere destructively at the output port B, but interfere constructively at the original input port A, thereby reflecting the data pulse. On the other hand, by injecting a large amplitude clock signal that is of a close but distinguishable wavelength relative to the data pulse wavelength, it is possible to overlap the clock pulse with the clockwise propagating data pulse and introduce a nonlinear phase shift of $\pi$. In this case, the interference condition is altered such that the data pulse now exits at port B. An optical bandpass filter at Port B suppresses the remaining clock signal, leaving only the desired gated data pulse. The width of the time gating window for the NOLM is defined by the overlap between the clock and co-propagating data pulse. The first NOLMs that were constructed required very long dispersion-shifted fibers (>1 km) to obtain the required nonlinear phase shift; however, recent developments in highly nonlinear fibers have allowed for a reduction in fiber length to approximately 100 meters or less. In conjunction with optical thresholding, the NOLM optical time gate has been successfully applied to an implementation of phase-coded OCDMA system.

Figure 7D:
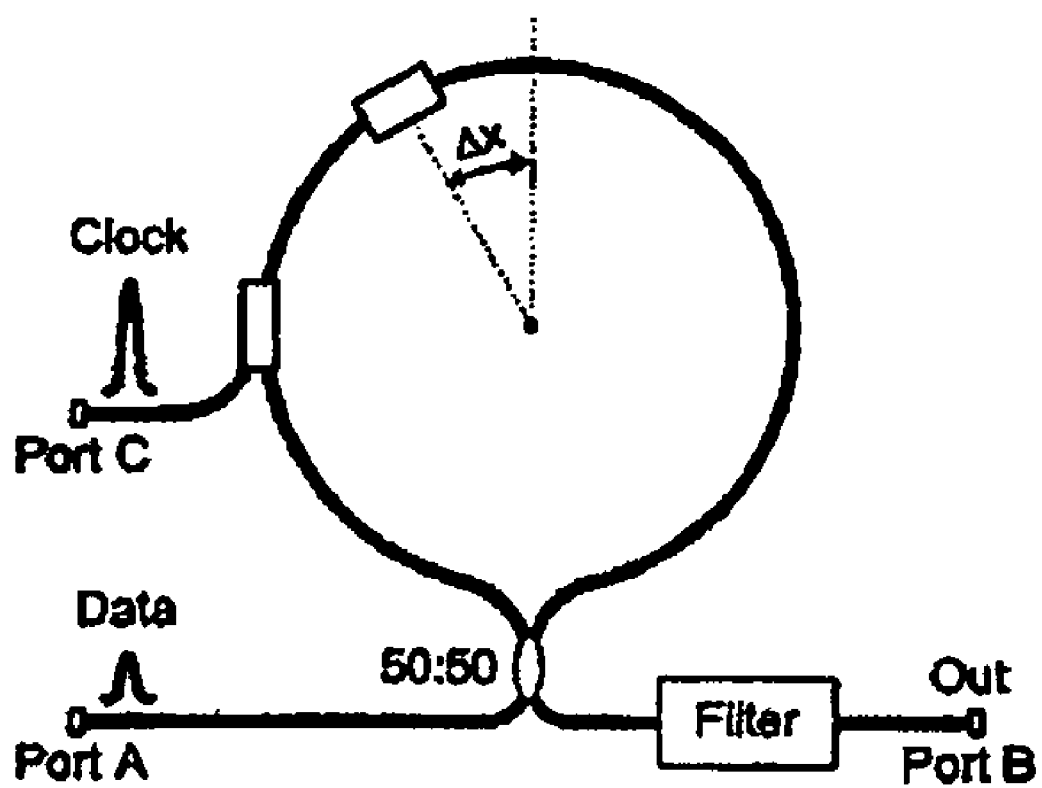
FIG. 7D illustrates an optical time gate in accordance with an aspect of the present invention.

The nonlinear phase change required in the NOLM can be accomplished by other means, such the use of as a semiconductor optical amplifier (SOA), allowing for the potential of device integration. An interferometric architecture similar to the NOLM can be used, as shown in FIG. 7D. When the SOA is offset from the center of loop by $\Delta x$, the device is referred to as the terahertz optical asymmetric demultiplexer or TOAD.

Similar to the NOLM, when the clock pulse is not present, incoming data pulses reflect from the TOAD. By injecting a clock pulse, which is typically chosen to be on the order of 10 dB larger in amplitude than the data pulse intensity, gating can occur. The clock pulse saturates the SOA, thereby changing its effective index. The clock pulse, which travels only in the clockwise direction, is injected following the clockwise propagating data pulse to give the clockwise data pulse the opportunity to propagate through the SOA before the clock pulse saturates the SOA index. Since the SOA slowly recovers on the time scale of hundreds of picoseconds, counter-propagating data pulses that arrive immediately after the clock pulse event has occurred see the SOA in approximately the same relative state and do not experience a differential phase shift. The temporal duration of the gating window is set by the offset of the SOA, $\Delta x$, from the center of the loop. As the offset is reduced, the gating window width decreases until the actual length of the SOA needs to be taken into account. The nominal gate width is related to the offset by $\Delta t_{gate}=2\Delta x/c_{fiber}$, where $C_{fiber}$ is the speed of light in fiber. Gating windows as short as 1.6 picoseconds have been demonstrated experimentally using a TOAD. The TOAD optical time gate has been successfully applied to an implementation of SPC-OCDMA. In the preferred embodiment, we used an SOA-based interferometric optical time gate.

In a CDMA system, the SNR of user i at the decision point is given by following expression:

$$SNR_i = \left(\frac{N_o}{E_b} + \frac{1}{6N^3}\sum_{\substack{j=1\\j\neq i}}^{M} r_{j,i}\right)^{-1} \quad (12)$$

where N is the code length, $E_b/N_o$ is the SNR when no MAI is present, and $r_{j,i}$ is a function of the aperiodic CC function:

$$r_{j,i} \cong 2\sum_{l=1-N}^{N-1} |C_{j,i}(l)|^2 \quad (13)$$

In order to minimize MAI, we can either increase the code length N or choose codes whose CCs are very low. Since the current generation of phase encoders allows access to at most N=16 frequency bins, we cannot rely on long codes to mitigate MAI but only on the minimization of the code CC.

Quasi-orthogonal codes (QOC), e.g. Gold, Kasami, are known to have very low CC, but their desirable CC properties are obtained for large values of the code length N. Although QOC allow for asynchronous access, they also have several drawbacks: receivers based on single user matched filter (independent detection of every user) are sub-optimal when QOC codes are employed; the near/far problem arises when users are not received at the same optical power; QOC exhibit very low spectral efficiency since the number of simultaneous users M that can be accommodated in the system with QOC is much less than the length of the codes (M<<N); a system employing QOC exhibits a widely variable BER which is a function of the users' relative delays. On the other hand, by imposing some form of system synchronization, Orthogonal Codes (OC) can be employed. When users are synchronized, OC have desirable properties which are independent of the code length N: OC have zero CC; the single user matched filter is optimum; 100% spectral efficiency may be approached (M=N, maximum number of users equal to the code length); and OC codes can exhibit stable BER behavior.

On the basis of the previous considerations we have chosen to use OCs for our system. Therefore, our system may be considered as a synchronous, orthogonal coherent OCDMA system. We have recognized that in order to achieve OCDMA/DWDM compatibility, the possibility of achieving high spectral efficiency is an important aspect given the small frequency spread allowable within the windows of the ITU WDM grid. Among the possible OCs available, we have chosen to use the Walsh-Hadamard sequences (WHSs). An advantage of using WHSs is that they are binary codes, thus leading to simple implementation of the phase mask.

As mentioned above, the output of the phase mask, i.e. the signal actually traveling on the fiber, is obtained by convolving the modulated optical signal at the input of the phase mask with the IFT of the phase code. Therefore, AC and CC properties of the phase codes must be analyzed on the basis of the IFT of the actual phase code and not on the phase code itself. Although the orthogonality of a code set is preserved after Fourier Transform (FT), the AC and CC properties of a codeset change when analyzed in the FT domain. In our investigation we found that the IFT of the WHSs constitutes a "better" family of spreading codes in the quasi-synchronous case than the WHSs themselves in terms of AC and CC properties.

Figure 8:
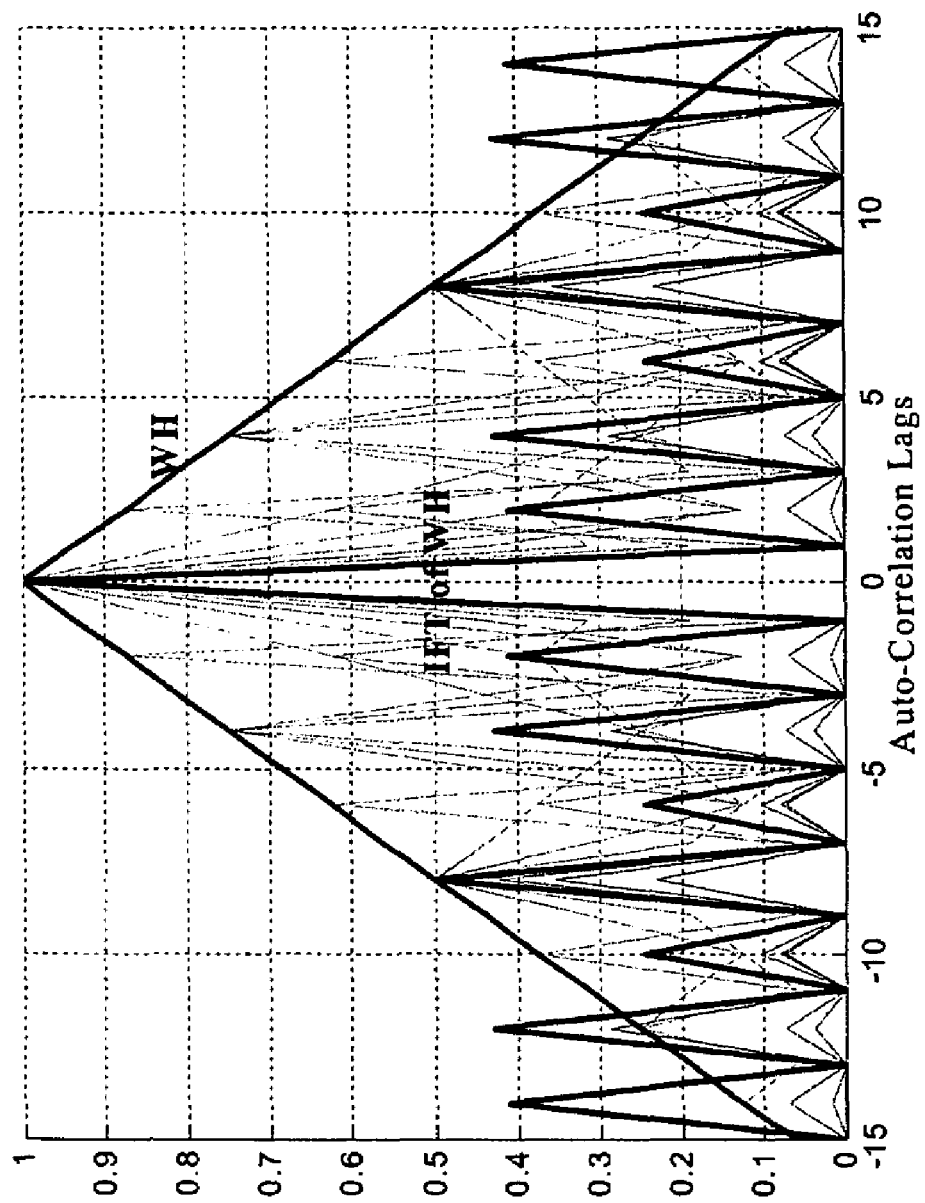
FIG. 8 is a plot of auto-correlation values of Walsh Haddamard sequences in accordance with an aspect of the present invention.
Figure 9:
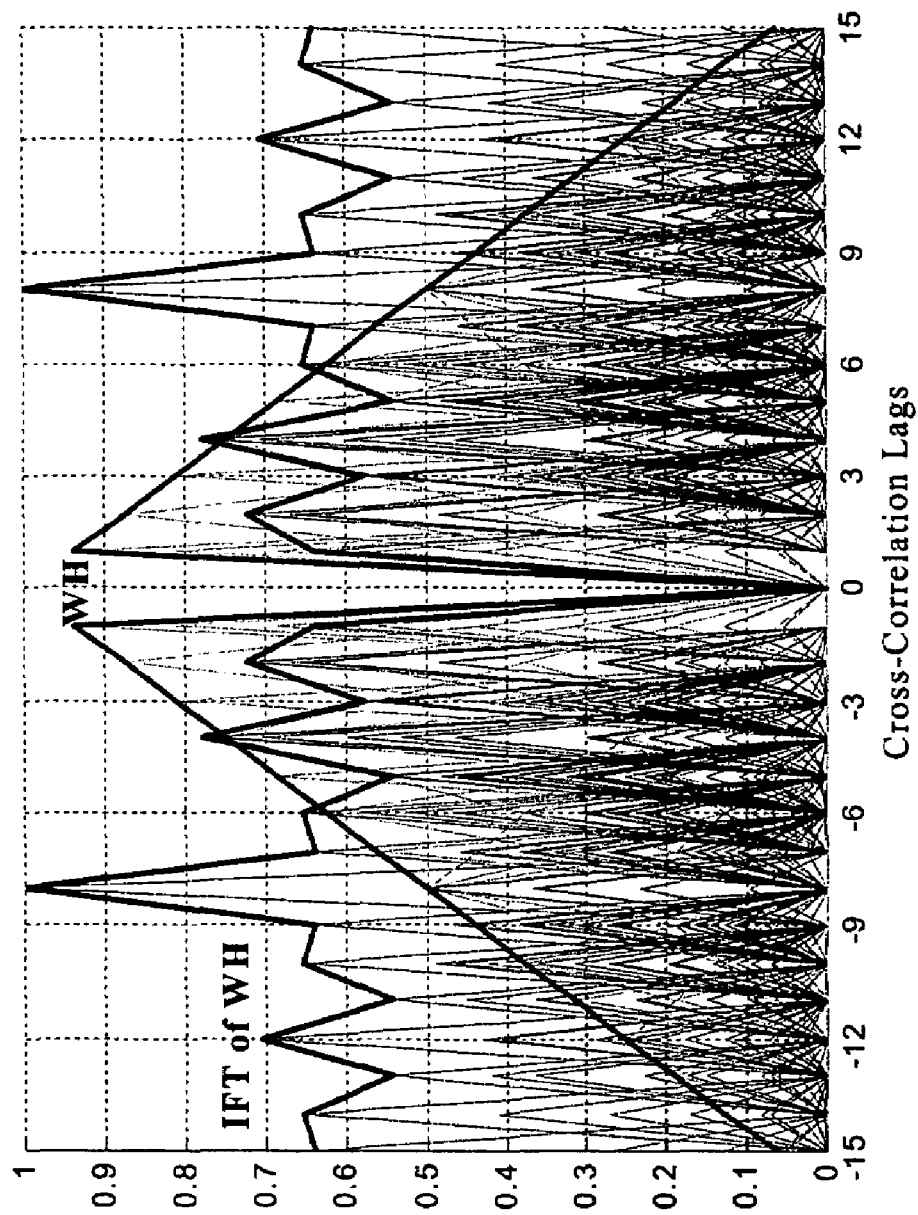
FIG. 9 is a plot of cross-correlation values of Walsh Haddamard sequences in accordance with an aspect of the present invention.

As an example, we compare in FIG. 8 the ACs of the WHSs with the ACs of the IFT of the WHSs for the case of N=16. In the plots, the normalized absolute values of all the 16 ACs have been plotted. The discrete ACs of the IFT of the WHSs also correspond to the chip rate sampled functions $AC_i(t)$ in eq. (11). As the figure shows, the WHSs have a much wider (thus, worse) AC than the AC of their IFT. Let us now compare in FIG. 9 the CCs of the WHSs with the CCs of the IFT of the WHSs for the case of N=16. In the plots, the normalized absolute values of all the CCs, i.e. (16 choose 2)=120, CCs have been plotted. Note that, as for the AC case, the discrete CCs of the IFT of the WHSs set also correspond to the chip rate sampled functions $CC_{j,i}(t)$ in eq. (11). As FIG. 9 shows, the CCs of the IFT-WHSs exhibit worse Multiple Access (MA) properties than the WHSs. However, the CC of WHSs is higher than the CC of the IFT-WHSs in the proximity of the zero-lag. Thus, in the quasi-synchronous operating mode, the IFT-WHSs provide better performance than the WHSs.

By introducing a code metric that summarizes MA properties of sequences, we can better assess the differences between sequences and their transforms. For example, we can use the RAC and RCC indexes that represent the average mean square value of the AC and CC of all sequences in a code set, respectively. Preferred MA codes have low values of RAC and low values of RCC. The set of N=16 WHSs and their IFT transforms exhibit the following values of RAC and RCC:

WHSs: RAC=4.06, RCC=0.73
IFT-WHSs: RAC=0.55, RCC=0.96

Therefore, from a MA point of view, the set of IFT-WHSs offer with respect to the set of WHSs: 1) better AC properties; 2) slightly worse CC properties for the fully asynchronous case; 3) slightly better CC properties for the quasi-synchronous case.

We also found that many other codes exhibit the same property, i.e. they exhibit better MA properties in the FT domain. This general behavior can be explained with the following example. Let us consider a phase code sequence x and its dual sequence y=IFT{x}. Let us also consider two extreme cases: A) x has only one non-zero element; B) x is constant. In these two cases we have that:

Case A
AC{x}=dirac→AC{y}=triangle
Case B
AC{x}=triangle→AC{y}=dirac

From a MA point of view, a dirac-shaped AC means that the spreading sequence is ideal. On the other hand, a wide AC means that the spreading sequence exhibits poor MA properties. Therefore, if a sequence has good AC properties (AC=dirac), its dual sequence obtained by performing an IFT has poorer AC properties (wider AC), and vice versa.

We also know that having good AC and CC MA properties is a competing property (sequences with good AC have poor CC, and vice versa) so that the "good" sequences typically used for DS-CDMA exhibit a compromise between AC and CC properties. Therefore, we can apply the same considerations made earlier and state that, if a sequence has good CC properties, its dual sequence obtained by performing an IFT has poorer CC properties, and vice versa.

On the basis of these considerations, we can reasonably conjecture that good (bad) sequences for DS-CDMA yield bad (good) phase codes for a spectrally phase encoded OCDMA system. However, in our code selection criterion, we are not limited only to choose bad codes for DS-CDMA. In fact, also good codes for DS-CDMA, which turn out to be a bad phase mask for our OCDMA, can also be employed provided that we utilize the FT of the code as the actual phase mask. Note that, in this case, also spectral amplitude encoding may become necessary since the FT of sequences of unitary amplitude are, in general, multi-amplitude sequences. Basically, the encoder becomes a filter. In fact, since AC and CC properties of our OCDMA system depend on the IFT of the sequences used as phase codes, the AC and CC properties of the sequences good for DS-CDMA would be the same as the AC and CC properties of the phase codes used in our spectrally phase encoded OCDMA system (which are the FTs of the "good" codes we started with). Therefore, a spectrally amplitude/phase encoded OCDMA system allows more degrees of freedom in the choice of phase codes suitable for MA. In fact, we can say that sequences that are bad for DS-CDMA should be used directly as phase codes, whereas the FT of sequences that are good for DS-CDMA should be used as amplitude/phase masks. We point out that these considerations can also be applied to other contexts, such as to wireless Multi-Carrier CDMA (MC-CDMA).

Figure 10:
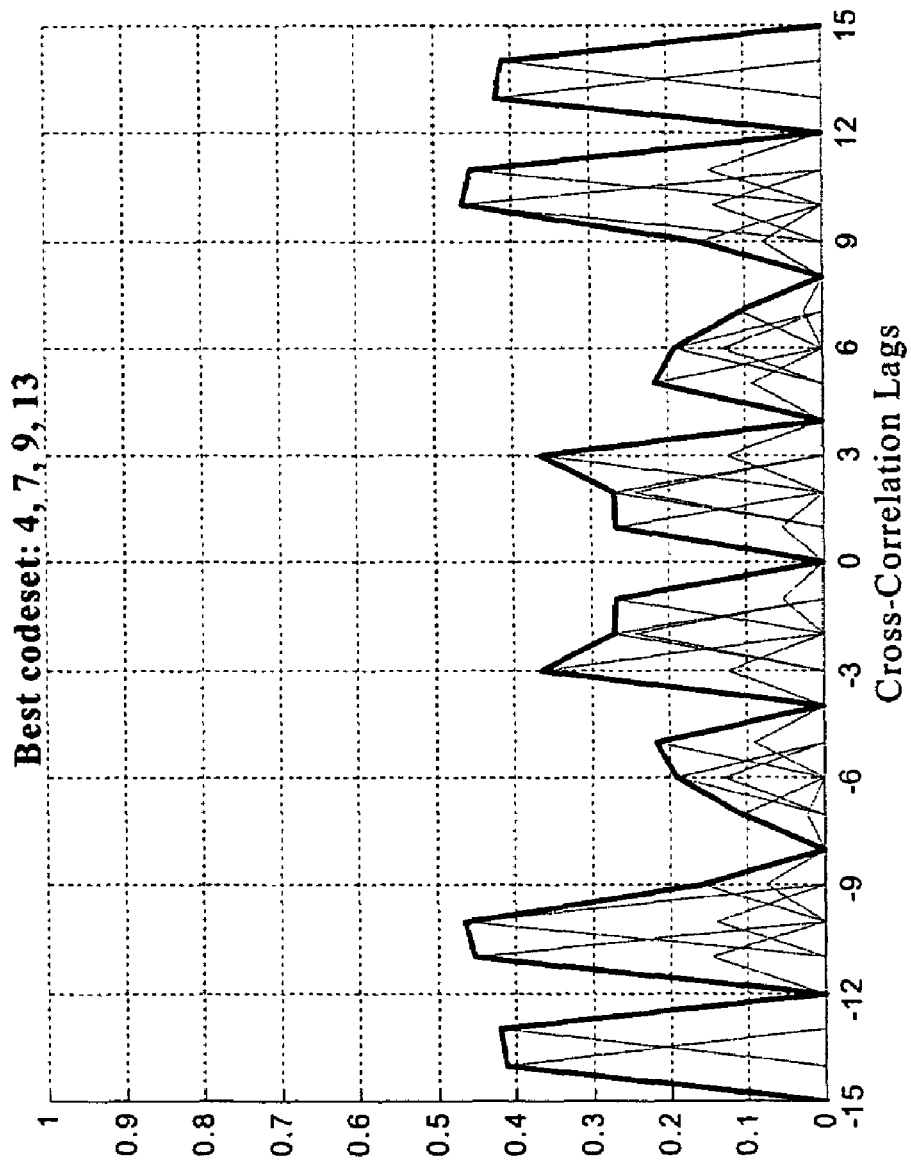
FIG. 10 is a plot of cross-correlation values of Walsh Haddamard sequences in accordance with an aspect of the present invention.

For example, we chose to provide MA to four users with WH phase codes of length N=16. In order to find the best four codes among the 16 available, we performed a code search using two criteria: A) minimum mean squared value of the CCs across all lags; B) minimum mean squared value of the CCs in the proximity of the zero-lag, as would be more appropriate for synchronous operation. Criterion A leads to the choice of the subset that exhibits the best CC properties for all possible relative delays between users (criterion suited for asynchronous operation), whereas Criterion B leads us to choose the subset that exhibits the best CC properties for small values of the relative delays between users (criterion suited for quasi-synchronous operation). The CCs of the best set of four codes according to the Criterion A are shown in FIG. 10. Similarly, FIG. 11 shows the CCs of the best subset according to Criterion B.

Figure 11:
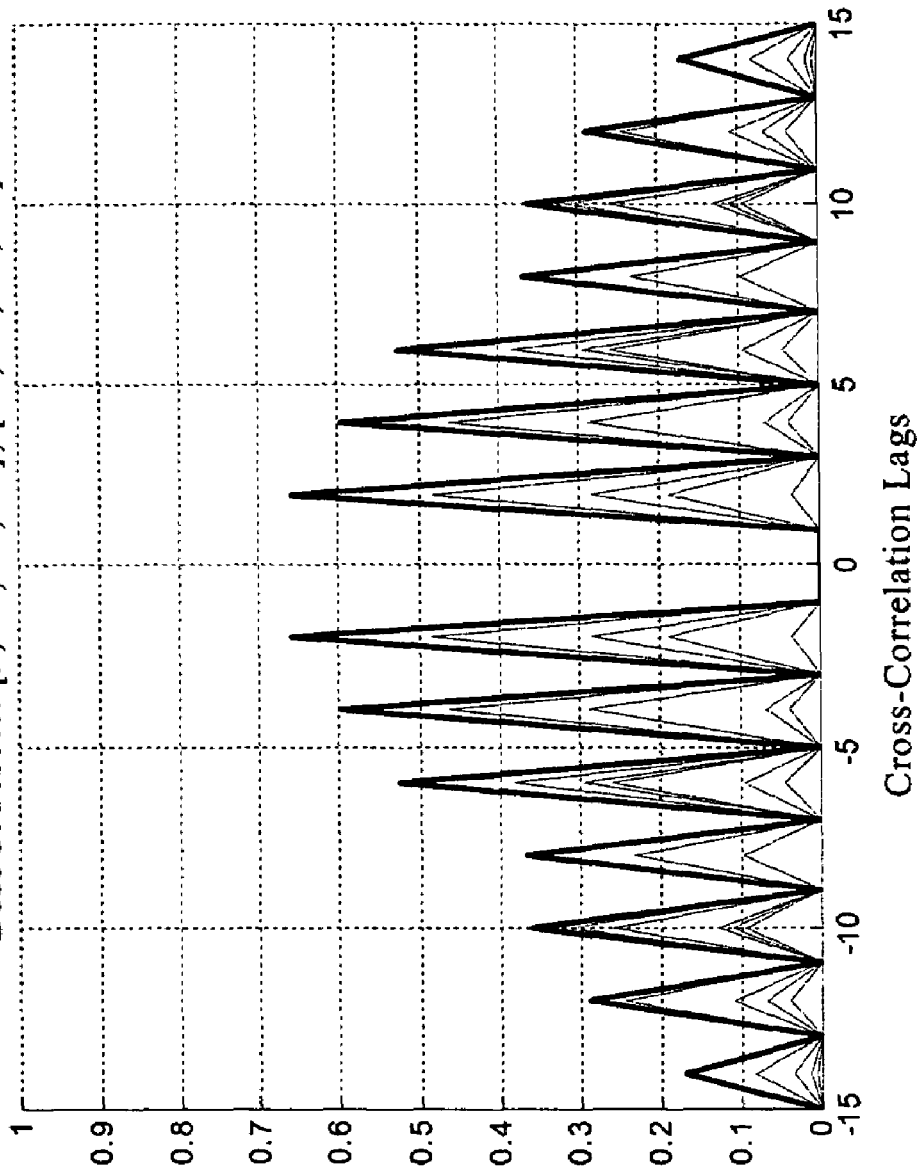
FIG. 11 is a plot of cross-correlation values of Walsh Haddamard sequences in accordance with an aspect of the present invention.

As FIG. 11 shows, the best subset chosen according to criterion B have zero CC not only at lag 0 (orthogonality property) but also at lags ±1. This property, which we refer to as Extended Orthogonality, ensures that the chosen codes offer strong resiliency to loss of synchronism up to relative delays among users of 1/N of the bit period. This property is absent when WHSs are used for DS spreading and is present only when WHSs are used as phase masks. The Extended Orthogonality property lead us to choose the subset of codes obtained on the basis of Criterion B for our experiments.

Let us now recast the time domain model in (11) in the frequency domain by writing the power spectral density (PSD) of the received signal at the output of the decoder matched to user i:

$$P_{y^{(i)}}(f) = \qquad (14)$$
$$P_{b^{(i)}}(f)|E^{(i)}(f)|^2 + + \sum_{j=1, j \neq i}^{M} P_{b^{(j)}}(f) E^{(j)}(f) E^{*(i)}(f) e^{-j2\pi f \tau(j)}$$

Ideally, Multiple Access (MA) codes should have a dirac-shaped AC, and zero CC for all lags. In practice, however, MA codes do not have these ideal properties so that MAI is always present in the decoded signal. Note that if orthogonal codes such as the Hadamard sequences are used, we can also obtain true orthogonality between users at the optimal sampling time:

$$IFT\{E^{(i)}(f) E^{*(j)}(f)\}_{t=t^*} = \begin{cases} 1, i=j \\ 0, i \neq j \end{cases} \qquad (15)$$

where IFT{A}$_{t=t^*}$ indicates the IFT of A computed at the t* time instant. Therefore, matched decoding allows us to recover the original MLL pulses while mismatched decoding results in exactly zero MAI at optimum sampling time t*. With appropriate synchronization between coded transmitters, a receiver can discriminate its matching coded signal from the (N−1) other signals by sampling the decoded signal at integer multiples of the bit-rate where the desired signal is maximized and the interfering signals are zero.

As (15) shows, the effects of matched and mismatched decoding of the received signal are governed by the product of the transfer function of the phase encoders. By looking at eqs. (3)-(5), it is also possible to say that the effects of matched and mismatched decoding are governed by the Schur-Hadamard product, i.e. element-by-element product, of the discrete sequences used as phase masks. This dependence of the MA properties on the Schur-Hadamard product of the discrete sequences used as phase masks, which are the equivalent of the spreading codes used in conventional DS-based spreading, is unique to spectrally phase encoded signals and has no counterpart in other CDMA implementations. As will be shown below, this property can be exploited to convey broadband signals over disjoint frequency bands.

Figure 12:
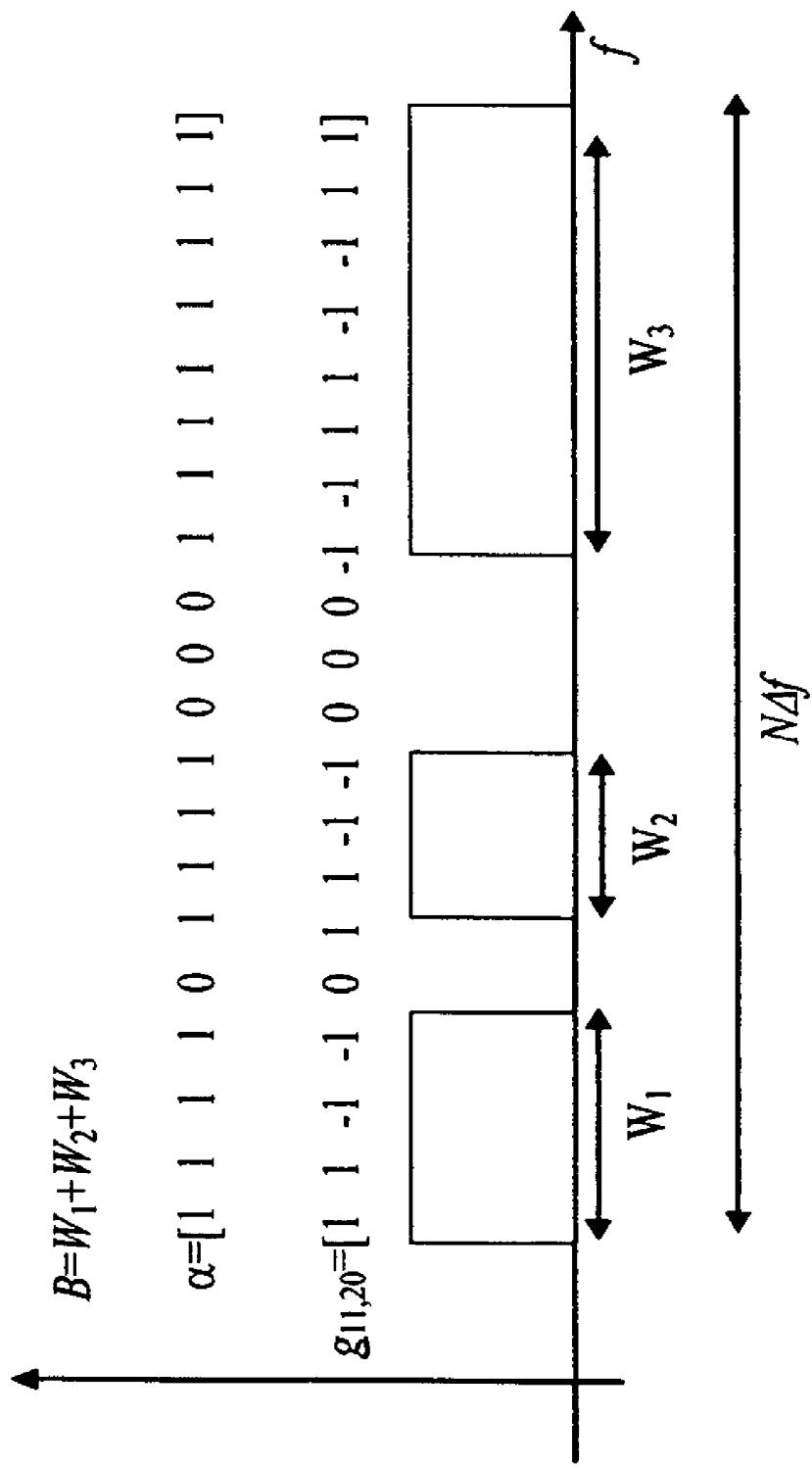
FIG. 12 illustrates an example of a disjoint frequency band in accordance with an aspect of the present invention.

Assuming that we have three disjoint frequency bands available for transmission, as shown in FIG. 12. We will show here that a spectrally phase encoded CDMA signal can be conveyed simultaneously over all the available bandwidth even if disjoint and that, at the same time, a spreading gain proportional to the total occupied bandwidth $B=W_1+W_2+W_3$ is also achieved.

Let us now recall the iterative definition of the Sylvester type Hadamard matrix $H_N$ of size (N,N):

$$H_{2N} = \begin{bmatrix} H_N & H_N \\ H_N & -H_N \end{bmatrix} \quad (16)$$

where the recursion starts posing $H_1=1$. $H_N$ satisfies the following orthogonality condition:

$$H'_N H_N = N I_N \quad (17)$$

where ' indicates the Hilbert operator, and $I_N$ represents the identity matrix of order N. Let us also define the as $h_{i,N}$ the ith column of $H_N$ that represents Hadamard code i. Then, the following relationship holds (here ∘ denotes the Schur-Hadamard product):

$$h_{i,N} \circ h_{j,N} = h_{j,N} \circ h_{i,N} = h_{k,N} \quad (18)$$

where k=1 iff i=j, and k=i (k=j) iff j=1 (i=1).

If disjoint frequency slivers of bandwidth are available, it is possible to use a phase sequence together with a simple binary {0,1} amplitude modulation as here below:

$$E^{(i)}(f) = \sum_{j=1}^{N} a_j^{(i)} RECT_{\Delta f}(f - f_j) \quad (20)$$

where, as opposed to (5) where the elements of $c^{(i)}$ could assume only unitary values, here $\alpha \in \{0,1\}$, $\alpha_j^{(i)} = \alpha e^{j\beta_j(i)}$, and $\alpha_j^{(i)} \in \{-1, 0, 1\}$. Basically, the parameter a is equal to 1 in the slivers of spectrum available for transmission and is equal to zero, otherwise (see FIG. 12).

An amplitude/phase mask, for example, as in (20) corresponds, in the domain of the spreading sequences, to a suitably zero padded version of the Hadamard sequence originally used for spreading. For example, consider the case where a user needs to transmit over the three disjoint bands in FIG. 12 with the Hadamard code $h_{11,16}$ of length N=16. The spectral amplitude/phase mask spans a free range of $N\Delta f$ Hz (see eq.(20)),and the Hadamard code is split in three sub-sequences of length 4, 4, 8, and then zero padded in between the sub-sequences.

Let us now define the zero padded version of the Hadamard sequence $h_{i,N}$ as $g_{i,N'}$ and as $G_{N'} = [g_{1,N'}; g_{2,N'}; \ldots ; g_{N',N'}]$ the matrix containing the zero-padded Hadamard codeset; N'=N+M, where M is the number of zeros added to each sequences in the codeset. Referring to the example in FIG. 12, N=16 and M=4. If we apply the orthogonality test in (17) to matrix $G_{N'}$ we then obtain the following:

$$G'_N, G_{N'} = \begin{bmatrix} NI_{L_1} & 0 & \cdots & \cdots & \cdots & 0 \\ 0 & 0_{L_2} & \ddots & & & \vdots \\ \vdots & \ddots & NI_{L_3} & \ddots & & \vdots \\ \vdots & & \ddots & 0_{L_4} & \ddots & \vdots \\ \vdots & & & \ddots & \ddots & 0 \\ 0 & \cdots & \cdots & \cdots & 0 & NI_{L_P} \end{bmatrix} \quad (21)$$

where P is the number of sub-sequences, $L_i$ (i=1, ..., P) is the length of the ith sub-sequence, $0_{L_i}$ is the all-zero element matrix of size ($L_i$, $L_i$), and $N'=L_1+ \ldots +L_P$. Referring to the example in FIG. 12, we have P=5, $L_1=4$, $L_2=1$, $L_3=4$, $L_4=4$, and $L_5=8$. As eq. (18) shows, orthogonality is maintained not only within each sub-band, but also across all the utilized bandwidth spanning $N\Delta f$Hz.

This property of spectrally amplitude/phase encoded OCDMA gives us many more degrees of freedom than in the conventional DS-based spreading for ensuring co-existence between OCDMA users and other modulation formats. Although only the orthogonal and synchronous case has been experimentally validated in our labs, the considerations here made apply to any spreading sequence used as a phase code, not only to the Hadamard one, and, thus, to both synchronous and asynchronous systems. In fact, in the asynchronous case, the diagonal identity matrices in (21) would be replaced by the correlation matrix of the M active users. We here assume the following: chronological labeling of users, i.e. we have $\tau_1 \leq \tau_2 \leq \ldots \leq \tau_U$, where $\tau_i$ is the delay of user i, with i=1, 2, ..., M and M<<N; N' is the length of the asynchronous zero-padded phase code. Then, under the above assumptions, the identity matrix in eq. (21) becomes an U×U (normalized) correlation matrix defined as follows:

$$R_U = \begin{bmatrix} 1 & \rho_{1,2} & \rho_{1,3} & \cdots & \cdots & \rho_{1,U} \\ \rho_{1,2} & 1 & \rho_{2,3} & \cdots & \cdots & \rho_{2,U} \\ \rho_{1,3} & \rho_{2,3} & 1 & \rho_{3,4} & \cdots & \vdots \\ \cdots & \cdots & \cdots & \cdots & \cdots & \vdots \\ \rho_{1,U-1} & \cdots & \cdots & \cdots & \cdots & \rho_{Li-1,U} \\ \rho_{1,U} & \cdots & \cdots & \cdots & \rho_{Li-1,U} & 1 \end{bmatrix} \quad (22)$$

$$\rho_{i,j} \equiv \rho_{i,j}(\tau_i - \tau_j), \text{ and } \rho_{i,j}(\tau) = \int_0^T e_i^*(t)e_j(t-\tau)dt$$

where $e_i(t)=IFT^{-1}\{E^{(i)}(f)\}$ is the impulse response of the spectral phase encoder $E^{(i)}(f)$ as defined in (3).

Figure 13:
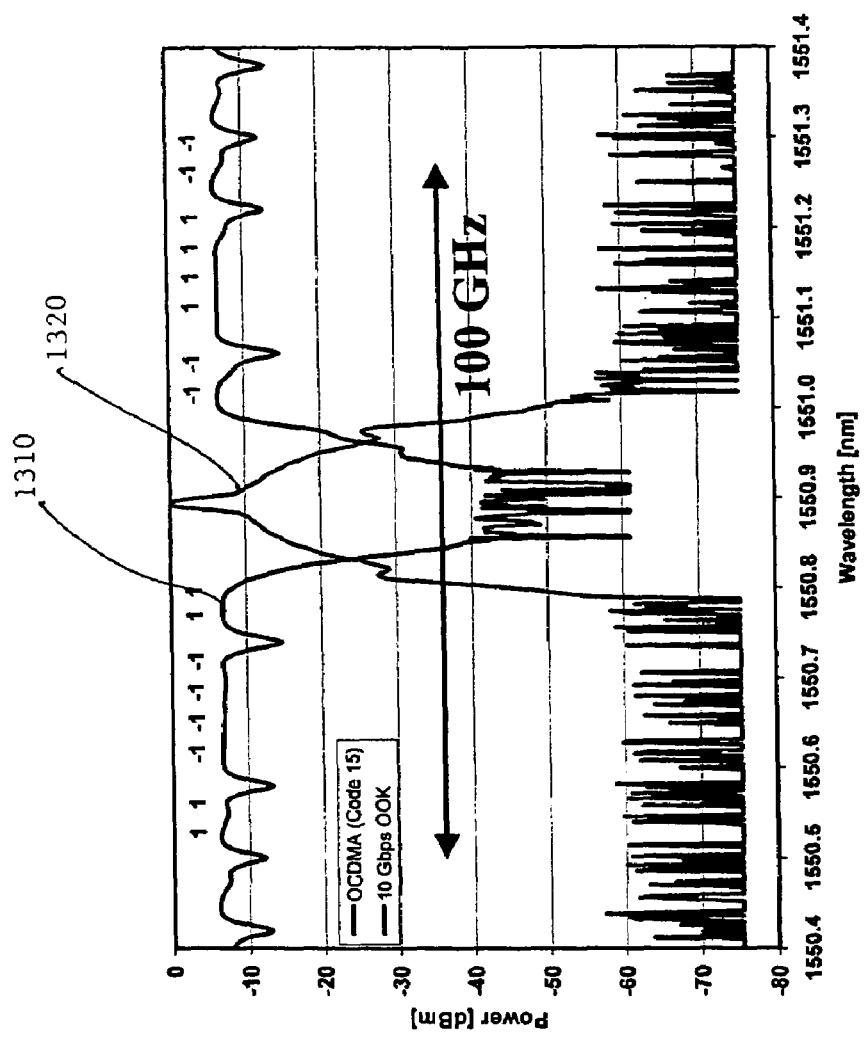
FIG. 13 is a plot of the optical spectra of two disjoint frequency bands and a transport signal.

As discussed above, phase encoded may be achieved by encoding the contiguous MLL lines using Hadamard codes using an Hyperfine optical coder. Hadamard codes are converted to phase codes by assigning to −1's and +1's phase shifts of 0 and π, respectively. IN accordance with this aspect of the present invention, we suitably modified the phase mask of the encoder shown, for example, in FIG. 5 in order to also allow for on-off amplitude encoding of the MLL spectral lines. In particular, we modified the phase mask in order to allow for: 1) de-multiplexing of 20 MLL lines (a total passband of 100 GHz); 2) phase encoding of the first 8 and the last 8 MLL lines using 0-padded Hadamard codes of length 16; 3) notching the 4 central MLL lines. As shown by the frequency response of one of the encoder/decoders in the top curve 1310 of FIG. 13, this allowed us to create a 20 GHz "spectral hole" in the middle of the OCDMA band. The purpose of creating this "spectral hole" is to allow for the insertion of a 10 Gbps OOK signal 1320. In accordance with this aspect of the present invention, the OCDMA system is actually spectrally spreading OCDMA users over a band characterized by a non-contiguous frequency range.

Figure 14:
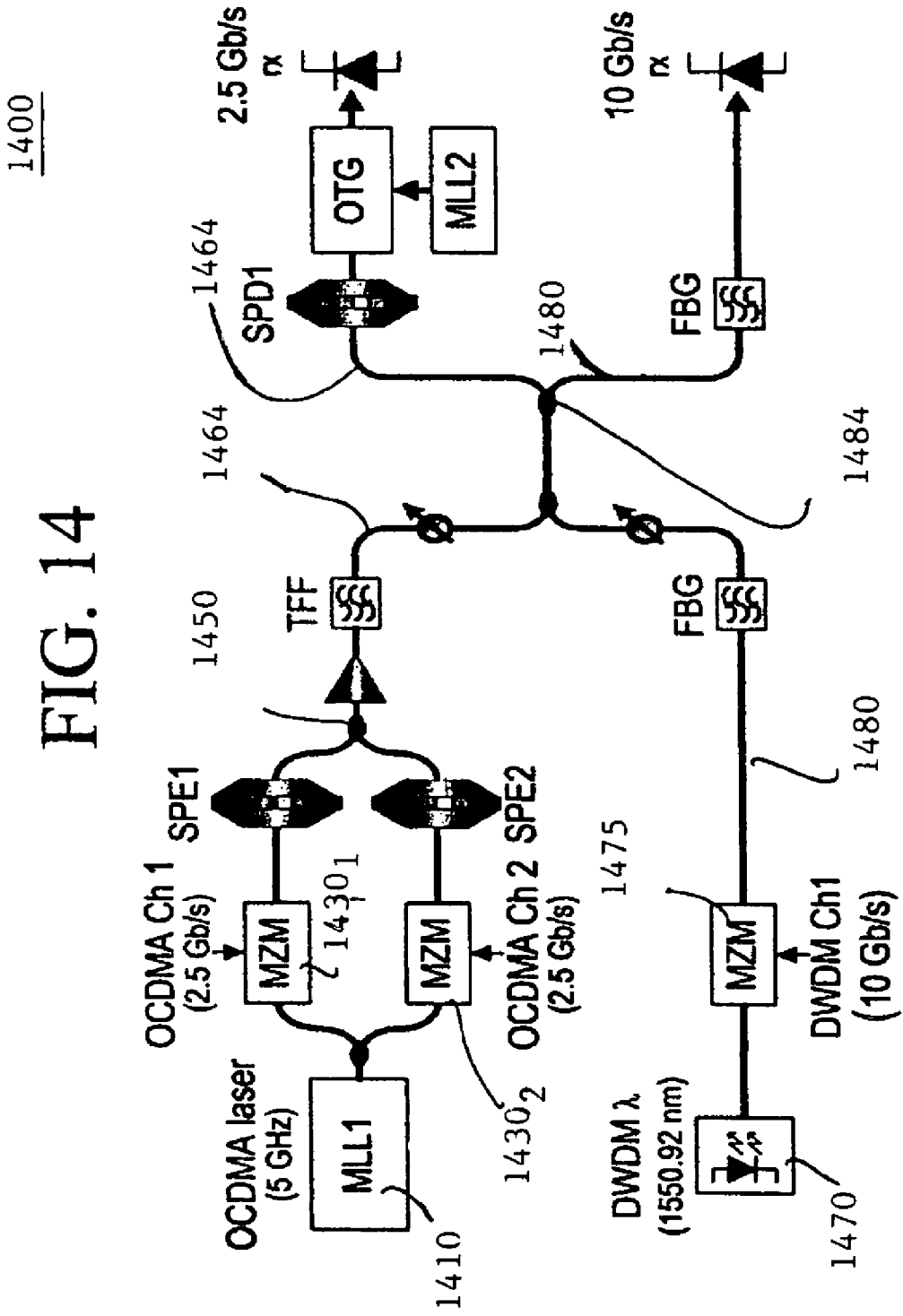
FIG. 14 is a system in accordance with an aspect of the present invention.

FIG. 14 illustrates a system 1400 in accordance with this aspect of the present invention. At the top left, a MLL 1410 produces a pulse train with 5-GHz repetition rate that is split 1420 to two Mach-Zehnder modulators (MZM) 1430 that impress independent PRBS data at OC-48 rate (2.5 Gb/s). Note that a single data bit is sent as a pair of pulses to cope with the bin edge effect described above. The modulated signals are encoded using two different spectral phase encoders (SPEs) and, with filtering and amplification, are combined with a standard OC-192 signal and launched over a short length of fiber. In particular, each independent PRBS data sequence is encoded using disjoint spectral phase encoders 1440 using, for example, a disjoint code set as discussed above in relation to FIGS. 12 and 13. The encoded signals are then combined 1450 and filtered 1460 to form the OCDMA signal 1464. In addition, an OOK transport signal, e.g., such as SONET or DWDM signal, is generated by source 1470 and modulated in the MZM modulator 1475. The modulated transport signal 1480 is then filtered and combined or added 1482 to OCDMA signal in the spectral hole or frequency band described above. At the receiver end, the two OCDMA signals and the OOK signal are separated by optical filters. The OOK signal is recovered with a standard SONET receiver while a spectral phase decoder (SPD) and optical time gate (OTG) isolates one of the OCDMA signals. More particularly, the signals are transported over a network to a splitter 1484. The splitter 1484 divides the signals into the OCDMA signal 1464 and the transport signal 1480 where they are further processed to recover the user data as discussed above.

Figure 15:
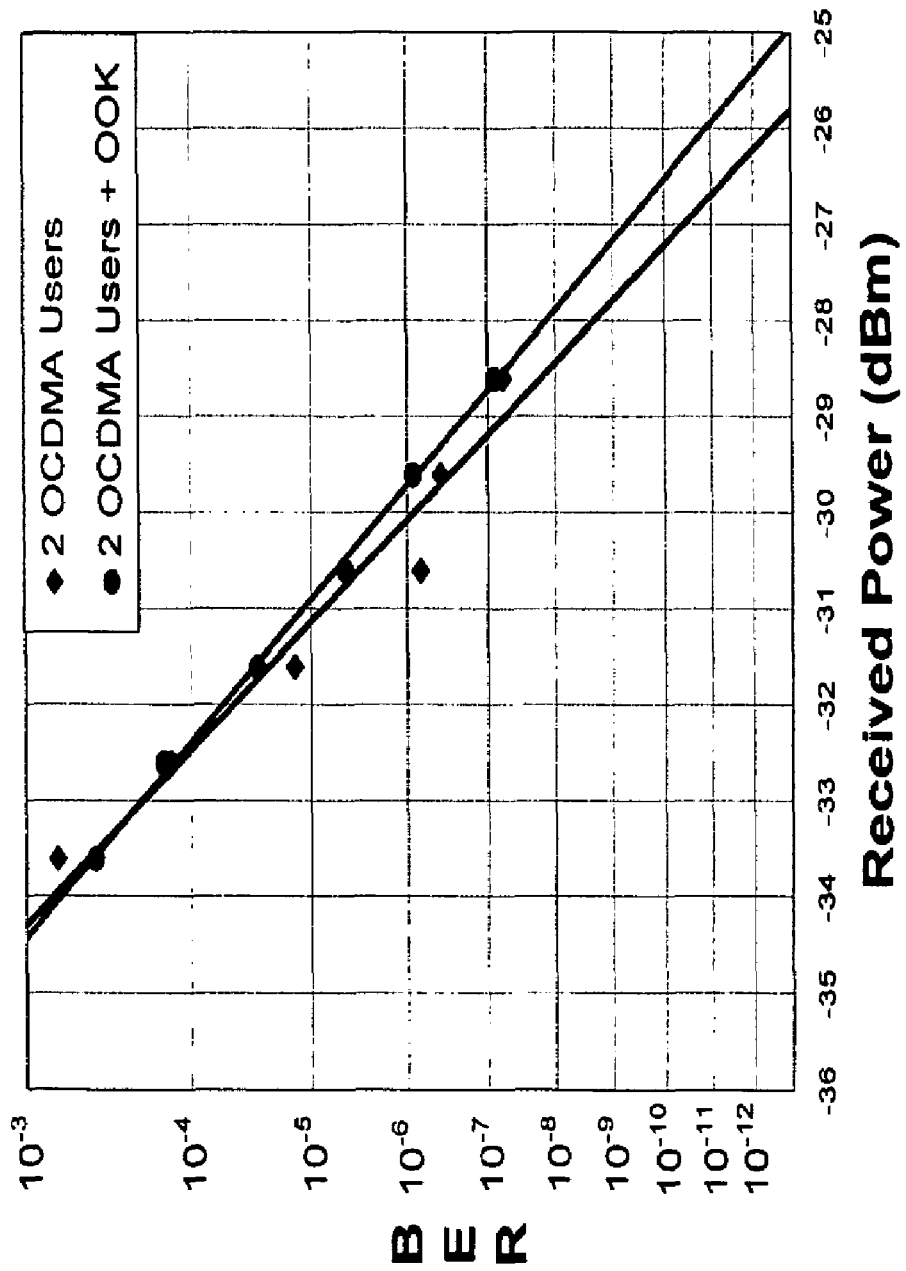
FIG. 15 is a plot of the bit error ratio versus received power of a system in accordance with an aspect of the present invention.
Figure 16:
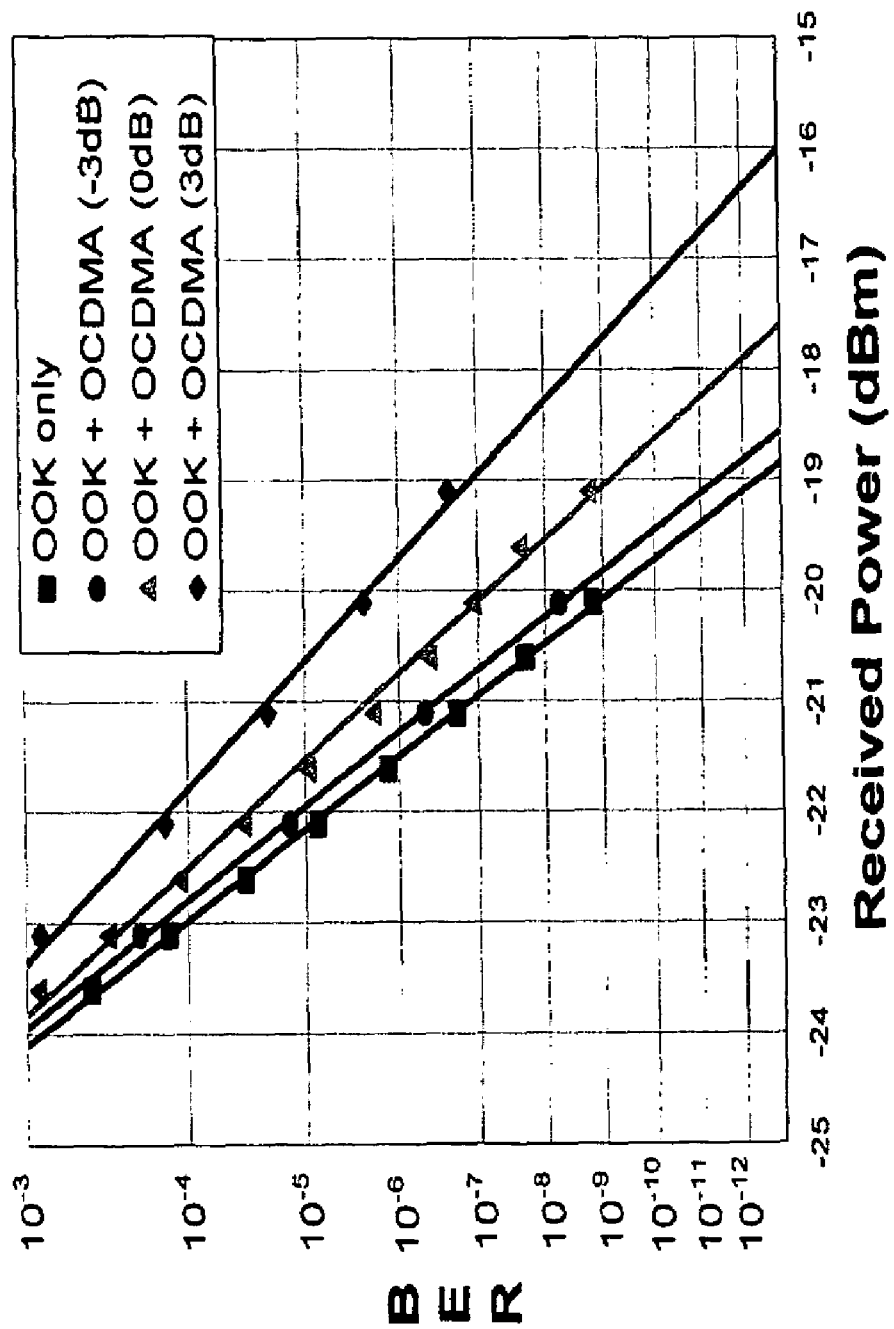
FIG. 16 is a plot of the bit error ratio versus received power of a system in accordance with an aspect of the present invention.

FIG. 15 shows the performance obtained decoding one of the OCDMA users (code 14) in the presence of the second OCDMA user (code 15) and of the OOK signal. FIG. 16 reports the OOK BER in four cases: when only the OOK channel is present, and when both the OOK and the two-user OCDMA channel are present with three different power levels. We considered the cases when the total power of the two OCDMA signal is equal to the OOK signal (0 dB curve) or at ±3 dB. Note that curve labeled "−3 dB" corresponds to the case where all three users (two OCDMA plus one SONET) exhibit the same received optical power. The experiments confirm that both the OCDMA and OC-192 channels exhibit a power penalty limited to 1 dB when the OCDMA signal is received at the same (or lower) power than the OC-192 signal.

In accordance with the foregoing, an aspect of the present invention is a spread-spectrum modulation format that consists of amplitude/phase encoding a broadband laser source. Coding and decoding are based on modifying the amplitudes and/or the relative spectral phases of a set of phase-locked frequencies that are output by a mode-locked laser (MLL). We use N equally spaced laser lines forming a stable comb of closely spaced phase-locked frequencies confined to a single (WDM window (e.g., 80 or 160-160) GHz) as frequency chips bins and amplitude/phase encode each chip bin. This approach advantageously allows for separately coding of individual discrete frequency lines and can use a small and tunable window which is compatible with WDM systems. This compact frequency spread provides more resiliency to channel impairments such as dispersion.

The train of short pulses output by the MLL has a repetition rate equal to the frequency spacing of the N laser lines. This source can be positioned spectrally within a desired WDM window by tuning an optical filter. The pulses output by the MLL are modulated to carry data and, afterwards, are amplitude/phase encoded in the frequency domain before being transmitted on the fiber that already is carrying the DWDM signals. If the amplitude/phase codes are chosen as described above, several of these amplitude/phase encoded signals may be transmitted simulataneously without causing any appreciable degradation to a SONET signal that may be present in the same DWDM window, and vice versa, or without causing any appreciably degradation to the WDM signal that may also be present in the utilized DWM window.

Since we utilize a broadband source and we transmit signals that have undergone a coding process, our novel modulation scheme can be seen as a form of Optical CDMA (OCDMA). However, there is a difference between conventional OCDMA and the present invention. Any form of Direct Sequence (DS) or Frequency (Wavelength) Hopping (FH) Spread Spectrum (SS) modulation format (and CDMA is a form of DS-SS) generates a signal whose power spectral density has a (quasi) continuous frequency support. In contrast, our approach based on amplitude/phase encoding of a broadband source allows us to generate signals whose power spectral density may have a discontinuous frequency support. By careful selection of the amplitude/phase codes used to encode the broadband signal output by the MLL, it is possible to generate signals whose power spectral density have virtually any kind discontinuous frequency support within the band of interest.

As in any other SS technique, each user is assigned a pseudorandom (PN) sequence. The transmitted pulse for a given user is determined by modulating the amplitude and the phase of the desired transmitted spectrum by a PN sequence. The available bandwidth is partitioned into N sub-bands or frequency bins, where N is called the spread-time spreading factor. Each bin is assigned a phase which depends on the user PN-sequence. The pulse is then obtained by taking the inverse Fourier transform of the resulting frequency response. At the receiver, the desired data can be recovered by sampling the output of a filter matched to the specific user pulse.

The input to the encoder is a modulated pulse. This pulse could be any wideband pulse: a pulse whose spectrum is continuous or a pulse whose spectrum is composed of discrete lines. The spectrum is then modulated with a PN sequence. There are many degrees of freedom is choosing the PN sequence assigned to every user: a Gold or Kasami code, a Walsh-Hadamard code; also mutually orthogonal complementary sets of sequences could be employed. In addition to phase encoding via the previously mentioned sequences, amplitude encoding is also introduced to suitably shape the spectrum of the transmitted OCDMA signal such that it does not overlap bandwidth occupied by the SONET channel. After filtering, the original short pulse is now spread in time (noise-like signal) and transmitted. The decoder is basically a matched filter, i.e. the conjugate of the pseudo-random sequence is used in the decoder.

The choice of the PN sequence to be used will depend on the applications and on the available slivers of spectrum. The PN sequence will be chosen in order to efficiently shape the spectrum of the transmitted signals in order to enable coexistence with existing transmission systems and, therefore, phase encoding will be applied only to those portions of the spectrum that are underutilized or idle, while filtering out the other frequencies. It is important to point out that our modulation format will enable us to transmit broadband signals (according to the spreading factor N) that may have a disjoint frequency support while maintaining the desirable orthogonality properties associated with contiguous-support OCDMA. Conventional SS signals do not have this property:

DS-SS signals necessarily occupy a continuous frequency support, whereas FH-SS signals allow users to occupy multiple and disjoint slivers of spectrum but only one sliver at a time.

In view of the foregoing, the operation of spectral phase encoding allows us to convey broadband signals over a disjoint (non-contiguous) frequency support. In addition, this property does not impair signal orthogonality so that it can be exploited both in synchronous and asynchronous OCDMA.

Note also that the various aspects of the present invention described above in apply to wireless CDMA systems as well as OCDMA systems and, therefore, a more spectrally efficient technique for allocating a scarce resource such as the RF spectrum can be obtained via spectral phase encoding. The current method of assigning spectrum to different radio systems is a fixed allocation scheme: one or more blocks of radio spectrum is allocated to a particular radio access network standard. These spectrum blocks are of fixed size and are separated by a fixed guard band. This method of allocation controls interference between different networks and is a simple and easily regulated way of managing the radio spectrum. However, fixed spectrum allocation has several disadvantages that do not allow efficient spectrum utilization in very dynamic situations. Large scale ad-hoc network planning involves dealing with many time-varying factors, e.g., topology, extent, propagation delays, multipath, routing, QoS, traffic patterns, etc., so that managing network complexity may well be beyond human planning. Conventional static frequency assignment may be simply impossible: there may not be enough spectrum for taking into considerations all possibilities; the level of signaling involved in network management and configuration further reduces data throughput; topologies are intrinsically dynamic and, therefore, unknown, a priori. Even if possible, conventional static frequency assignment would typically be inefficient. In fact, bands show local heavy, medium, and sparse activity so that transient "opportunity holes" (not necessarily contiguous) in the spectrum arise. Therefore we face a true paradox: the radio spectrum, whilst being a scarce and valuable commodity, is often underused or idle at certain times or in certain areas.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system for transmitting user data over a network defined by a usable frequency band that includes a continuous frequency range, comprising:
   an encoder that operates to encode a signal transmitted by a user to occupy a plurality of non-contiguous frequency bands within the continuous frequency range; and
   an optical time gate that operates to temporally extract the signal transmitted by the user from among a plurality of other signals in the plurality of non-contiguous frequency bands.

2. The system of claim 1, wherein the network comprises an optical network and the continuous frequency range is characterized by a set of discrete frequencies.

3. The system of claim 2, further comprising a laser source for generating the set of discrete frequencies.

4. The system of claim 2, wherein the non-contiguous frequency range comprises a subset of the set of discrete frequencies.

5. The system of claim 4, wherein the encoder comprises a phase mask that encodes the phase of each discrete frequency that comprises the subset of discrete frequencies.

6. The system of claim 1, wherein the encoder comprises a mask that operates to adjust the phase and amplitude of the user signal to convey the user signal over a plurality of non-contiguous frequency bands.

7. The system of claim 1, wherein the mask uses a zero-padded orthogonal or quasi-orthogonal spreading sequence.

8. The system of claim 1, wherein the network comprises a wireless network and the encoder comprises a pseudo-random phase encoder, the system further including a radio-frequency transmitter for transmitting the encoded signal onto the network.

9. An optical code division multiple access system, comprising:
   a data modulator for receiving an optical pulse sequence having N spectral lines, and modulating the pulse sequence with a signal to produce a modulated signal;
   a spectral encoder for encoding the amplitude and phase of the modulated signal, the encoder being operable to define a coding pattern having N symbols, each symbol being associated with a particular one of the N spectral lines of the modulated signal, and forming a plurality of non-contiguous spectral bands separated by one or more spectral gaps; and
   an optical time gate for temporally extracting the signal from the modulated signal.

10. The system of claim 9, further comprising means for transmitting the modulated signal using the one or more spectral gaps.

11. The system of claim 10, wherein the means for transmitting includes a wavelength division multiplexer.

12. The system of claim 9, wherein the data modulator comprises an on-off keyed modulator.

13. The system of claim 9, wherein the spectral encoder comprises a phase mask filter that defines a phase shift for each of the N symbols.

14. The system of claim 13, wherein the phase shift for each of the N symbols comprises an orthogonal or quasi-orthogonal code set.

15. A method for transmitting data, comprising:
   modulating an optical pulse with user data, the modulated optical pulse comprising N-contiguous spectral lines;
   encoding the modulated optical pulse such that the N-contiguous spectral lines are partitioned into two or more groups of non-contiguous spectral lines within the N-contiguous spectral lines, each of the groups being separated by a frequency band;
   adding one or more signals to the encoded signal;
   decoding the encoded signal to retrieve the modulated optical pulse; and
   optically gating the modulated optical pulse to retrieve the user data.

16. The method of claim 15, further comprising selecting an encoding sequence that is either a spreading sequence or its Fourier transform.

* * * * *

UNITED STATES PATENT AND TRADEMARK OFFICE
CERTIFICATE OF CORRECTION

| | | |
|---|---|---|
| PATENT NO. | : 7,574,144 B2 | Page 1 of 1 |
| APPLICATION NO. | : 11/262657 | |
| DATED | : August 11, 2009 | |
| INVENTOR(S) | : Galli et al. | |

It is certified that error appears in the above-identified patent and that said Letters Patent is hereby corrected as shown below:

In the Drawings

In Fig. 2, Sheet 3 of 21, for Tag "294", in Line 1, delete "SYCHRONIZATION" and insert -- SYNCHRONIZATION --, therefor.

In the Specification

In Column 4, Line 25, delete "code set" and insert -- code set. --, therefor.

In Column 5, Lines 3-4, delete "Haddamard" and insert -- Hadamard --, therefor.

In Column 5, Lines 6-7, delete "Haddamard" and insert -- Hadamard --, therefor.

In Column 5, Lines 9-10, delete "Haddamard" and insert -- Hadamard --, therefor.

In Column 5, Lines 13-14, delete "Haddamard" and insert -- Hadamard --, therefor.

In Column 8, Line 64, delete "mask." and insert -- mask, --, therefor.

In Column 14, Line 1, delete "e.g." and insert -- e.g., --, therefor.

In Column 20, Line 6, delete "simulataneously" and insert -- simultaneously --, therefor.

Signed and Sealed this
Eleventh Day of November, 2014

Michelle K. Lee
*Deputy Director of the United States Patent and Trademark Office*